(12) United States Patent
Hamilton et al.

(10) Patent No.: US 12,116,215 B2
(45) Date of Patent: Oct. 15, 2024

(54) CASE REORIENTATION SYSTEM AND METHOD

(71) Applicant: Symbotic Canada, ULC, Lafontaine Montreal (CA)

(72) Inventors: Trevor Hamilton, Mascouche (CA); Ugo Demers, Ste-Marthe sur le Lac (CA); Sylvain-Paul Morency, Laval (CA)

(73) Assignee: Symbotic Canada, ULC, Wilmington, MA (US)

( * ) Notice: Subject to any disclaimer, the term of this patent is extended or adjusted under 35 U.S.C. 154(b) by 0 days.

(21) Appl. No.: 18/172,064

(22) Filed: Feb. 21, 2023

(65) Prior Publication Data

US 2023/0202770 A1    Jun. 29, 2023

Related U.S. Application Data

(63) Continuation of application No. 17/645,377, filed on Dec. 21, 2021, now Pat. No. 11,584,595, which is a continuation of application No. 17/118,475, filed on Dec. 10, 2020, now Pat. No. 11,203,492.

(60) Provisional application No. 62/946,763, filed on Dec. 11, 2019.

(51) Int. Cl.
*B65G 47/24* (2006.01)
*B65G 47/26* (2006.01)
*B65G 47/74* (2006.01)

(52) U.S. Cl.
CPC ............. *B65G 47/24* (2013.01); *B65G 47/26* (2013.01); *B65G 47/74* (2013.01)

(58) Field of Classification Search
CPC ......... B65G 47/24; B65G 47/26; B65G 47/74
USPC .......................... 414/758, 759, 769, 773, 774
See application file for complete search history.

(56) References Cited

U.S. PATENT DOCUMENTS

| | | | |
|---|---|---|---|
| 3,829,072 A | 8/1974 | Fieser et al. |
| 3,954,170 A | 5/1976 | Schlough |
| 4,808,065 A | 2/1989 | Hattori et al. |
| 5,025,911 A | 6/1991 | Raasch et al. |
| 7,985,044 B2 | 7/2011 | Tamura |
| 8,425,173 B2 | 4/2013 | Lert et al. |
| 8,439,625 B2 | 5/2013 | Pass et al. |

(Continued)

FOREIGN PATENT DOCUMENTS

| | | |
|---|---|---|
| CN | 105947611 | 9/2016 |
| JP | 2007254127 | 10/2007 |

*Primary Examiner* — Douglas A Hess
(74) *Attorney, Agent, or Firm* — Perman & Green, LLP

(57) ABSTRACT

A case orienting system comprising a frame having a reference datum a traverse transport pivotally coupled to the frame about a traverse pivot axis, the traverse transport including a substantially continuous movable platform configured to support and transport at least one case in a case traverse direction along a traverse axis. The substantially continuous movable platform pivots about the traverse pivot axis to orient the case traverse direction to another traverse direction and a bias support disposed adjacent to and opposing the traverse transport and being movably coupled to the frame to move relative to the frame in opposition to the traverse transport, the bias support being configured to engage and seat against a seating surface of the at least one case to support the at least one case in a first orientation relative to the reference datum.

31 Claims, 16 Drawing Sheets

(56) References Cited

U.S. PATENT DOCUMENTS

| | | | |
|---|---|---|---|
| 8,827,067 B2 * | 9/2014 | Iwasa | B65G 21/2072 |
| | | | 198/401 |
| 9,120,635 B2 | 9/2015 | Su | |
| 9,573,774 B2 | 2/2017 | Schnur et al. | |
| 9,701,490 B2 | 7/2017 | Morency et al. | |
| 9,758,314 B2 | 9/2017 | Mao | |
| 10,370,199 B2 | 8/2019 | Ducharme et al. | |
| 10,807,805 B2 | 10/2020 | Clucas et al. | |
| 10,894,676 B2 | 1/2021 | Turpin et al. | |
| 2004/0050659 A1 | 3/2004 | Jensen | |

* cited by examiner

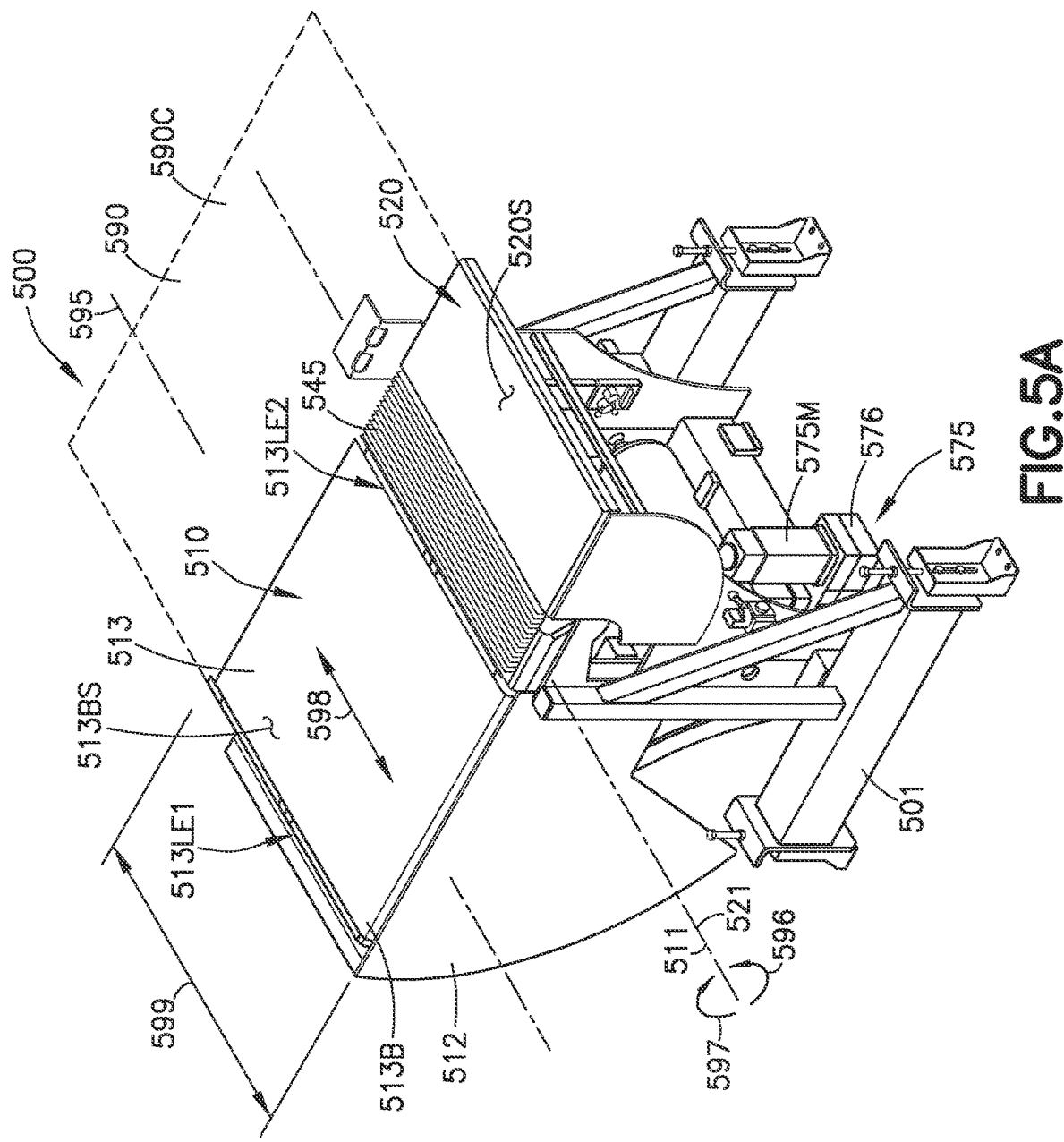

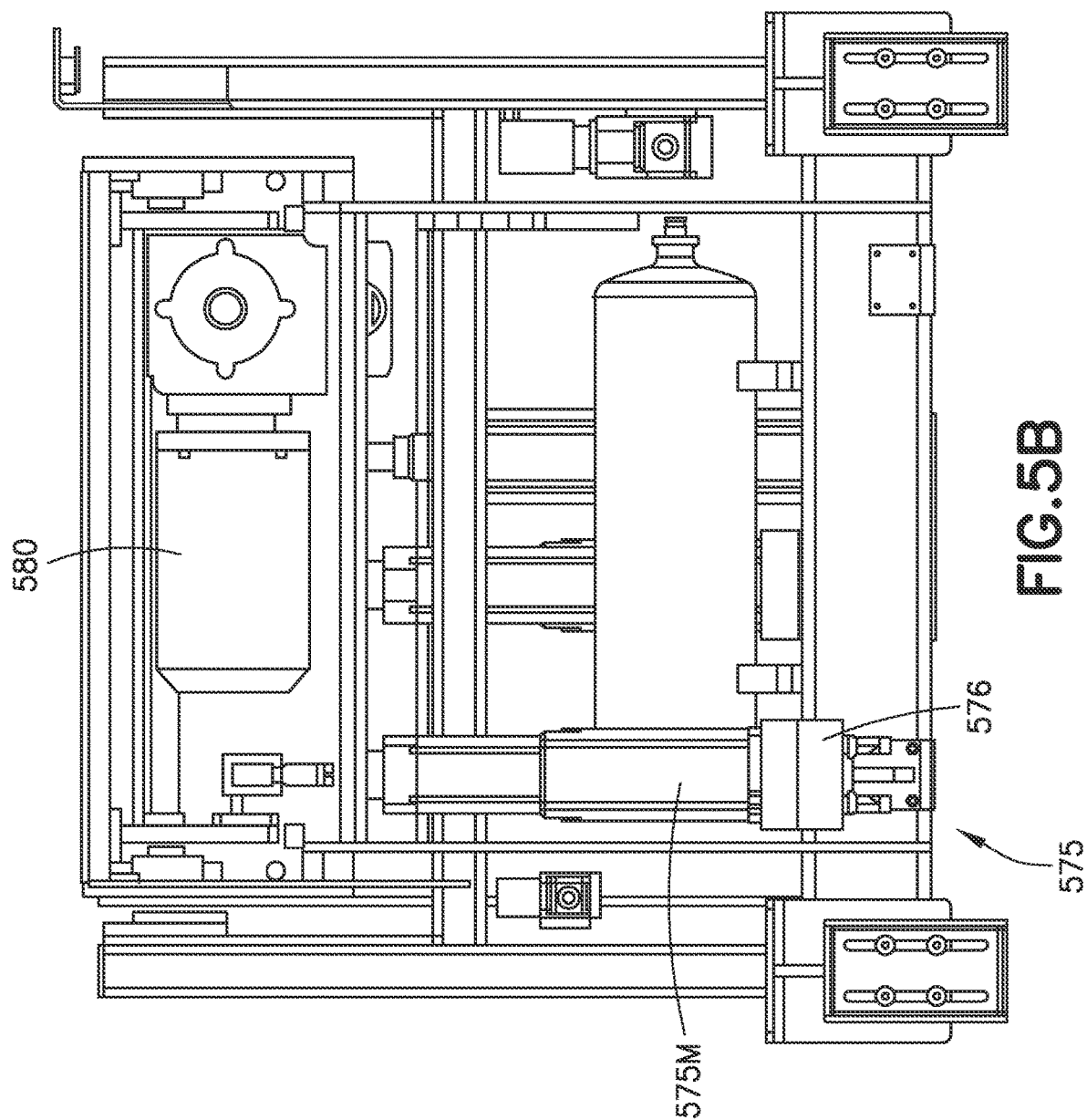

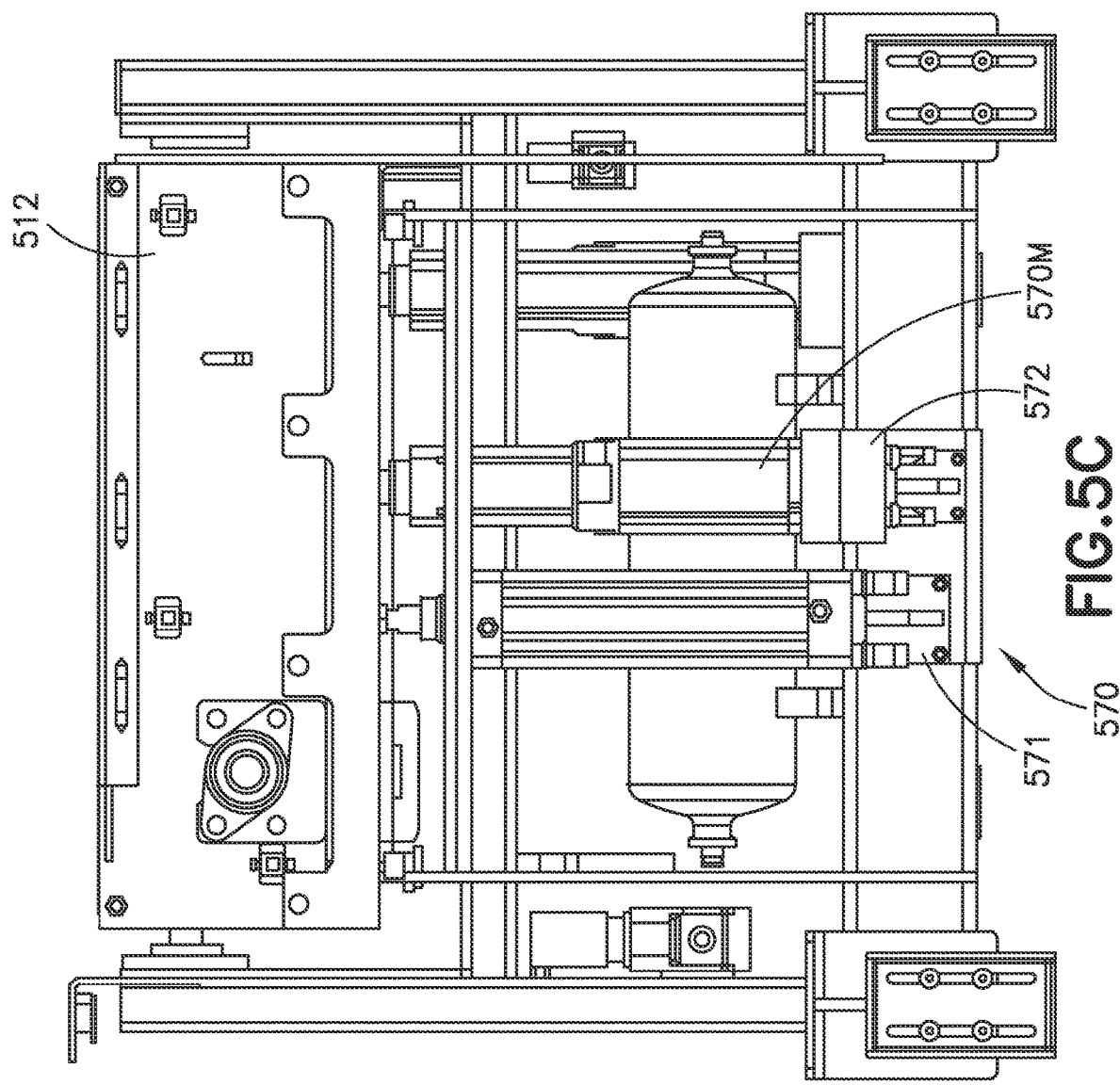

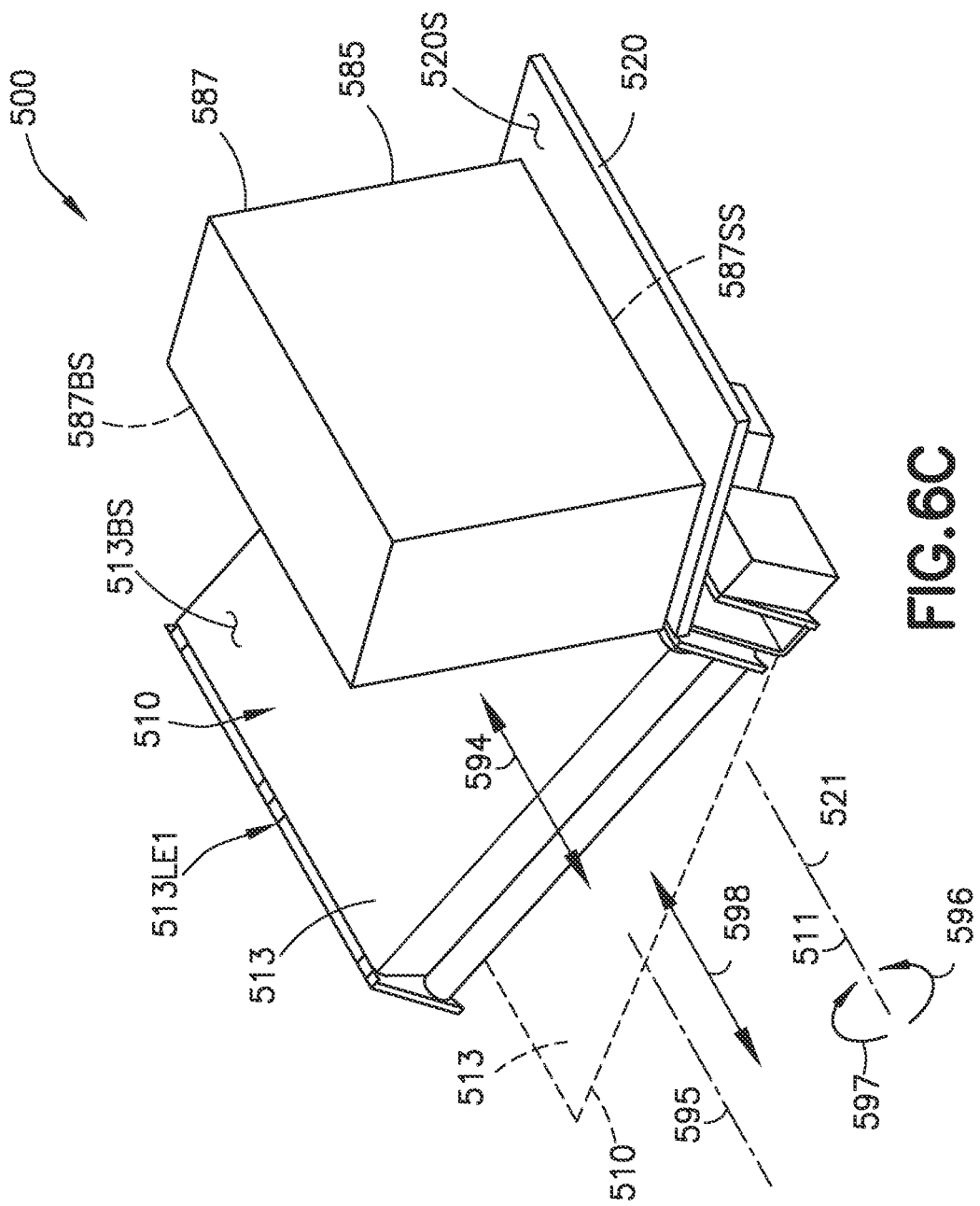

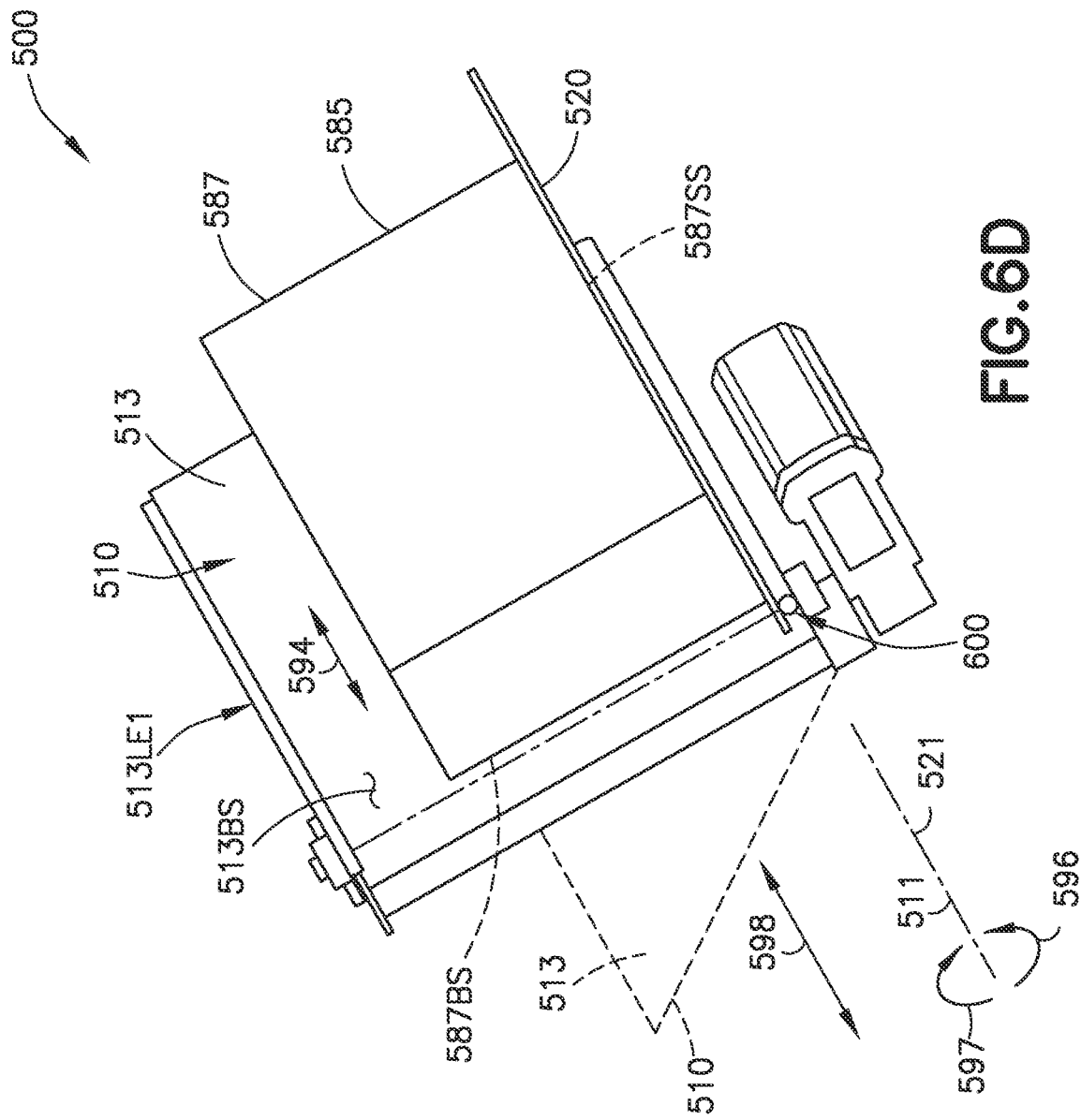

CASE REORIENTATION SYSTEM AND METHOD

CROSS-REFERENCE TO RELATED APPLICATIONS

This application is a continuation of U.S. patent application Ser. No. 17/645,377, filed Dec. 21, 2021, (now U.S. Pat. No. 11,584,595), which is a continuation of Ser. No. 17/118,475, filed Dec. 10, 2020, (now U.S. Pat. No. 11,203,492), which is a non-provisional of and claims the benefit of U.S. Provisional Patent Application No. 62/946,763, filed on Dec. 11, 2019, the disclosures of which are incorporated herein by reference in their entireties.

BACKGROUND

1. Field

The exemplary embodiments generally relate to distribution facilities, and more particularly, to case transportation within the distribution facility.

2. Brief Description of Related Developments

Generally, goods are transported and/or stored in cases and/or containers and generally referred to as cased goods. The cased goods may be transported goods from one logistics location to another. The cased goods may also be stored at predetermined storage locations in, for example, logistic facilities such as warehouses and distribution facilities. In some instances the logistics facilities are automated such that the cased goods are transferred to and from storage with automated equipment. As cased goods are introduced into the logistics facility, the cased goods may be removed from pallets and placed on conveyors. It may be desired to reorient some of the cased goods placed on the conveyors from an initial case placement orientation on the conveyor so that the reoriented cased goods may be transported and placed in storage.

Conventional case reorientation/tipping devices generally provide unrestrained reorientation of the cased goods and generally increase a length of the case transport system in which they are employed.

BRIEF DESCRIPTION OF THE DRAWINGS

The foregoing aspects and other features of the disclosed embodiment are explained in the following description, taken in connection with the accompanying drawings, wherein:

FIG. 5A is a schematic perspective view of a case orienting system in accordance with aspects of the disclosed embodiment;

FIGS. 5B-5C are schematic illustrations of a portion of the case orienting system of FIG. 5A in accordance with aspects of the disclosed embodiment;

FIGS. 6A-6F are schematic illustrations of a case orienting sequence of a case orienting system in accordance with aspects of the disclosed embodiment.

DETAILED DESCRIPTION

Figure 1:
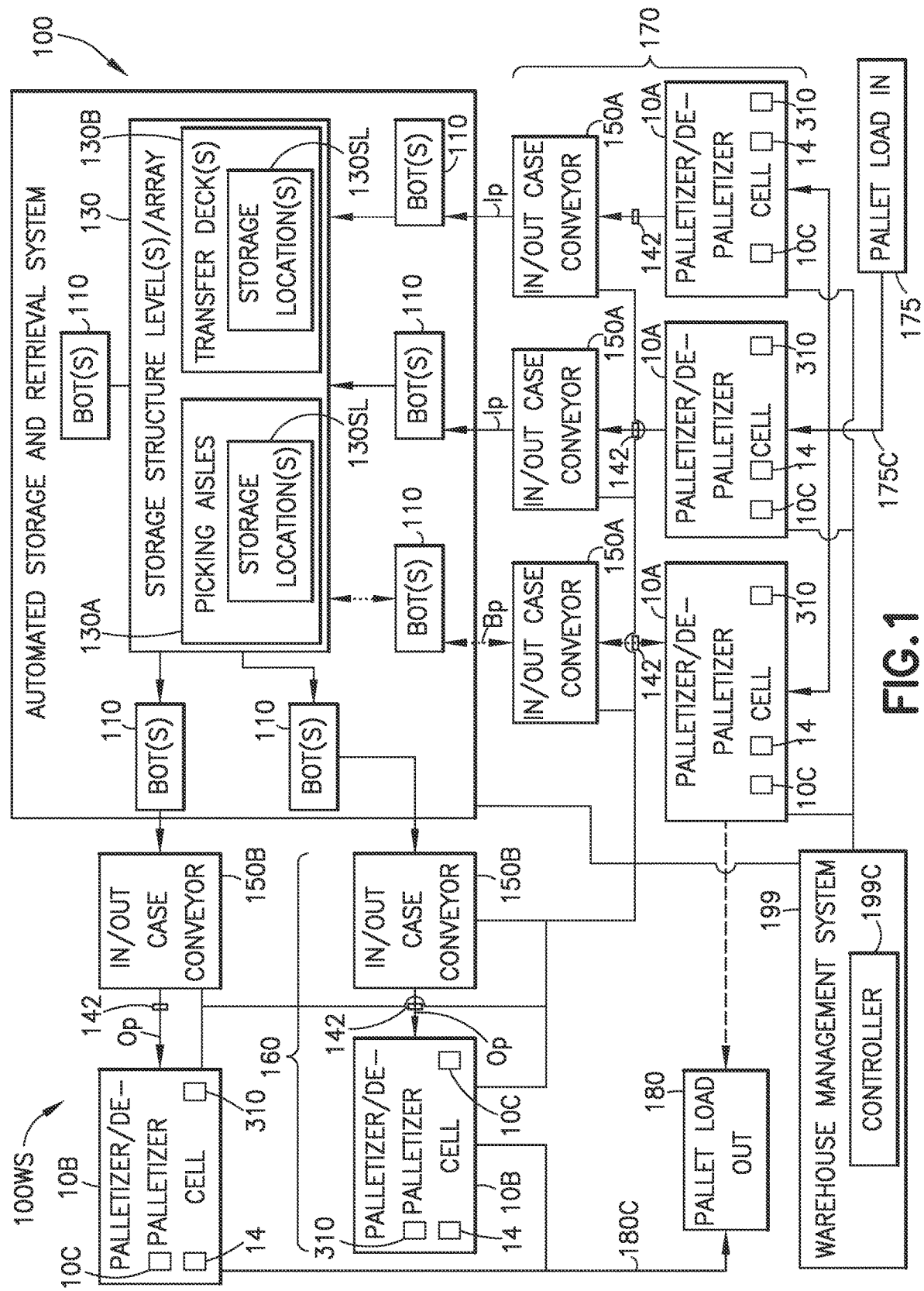
FIG. 1 is a schematic illustration of a distribution facility in accordance with aspects of the disclosed embodiment.

FIG. 1 is a schematic illustration of a warehouse system or distribution facility 100WS (referred to herein as warehouse system 100WS) in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used. It should be understood that while the warehouse system 100WS is described herein as an automated warehouse system the aspects of the disclosed embodiment are also applicable to distribution facilities having any suitable transport systems, such as both automated and manual transport systems or to wholly manual transport systems.

Referring to FIGS. 1 and 5A, the aspects of the present disclosure provide for a case orienting system 500 that may be incorporated into an in/out case conveyor 150 (or any other suitable case conveying system of the warehouse system 100WS) substantially without increasing a length of the in/out case conveyor 150 (or other suitable case conveying system). For example, the case orienting system 500 may have a length 599 (i.e., in a case travelling direction—also referred to as a traverse axis 595 of the conveyor 150) that is substantially the same conveying length as a standard (i.e., non-reorienting for a max accepted case size of the system (e.g., unit convey length)) conveyor section. In one aspect, the length 599 of the case orienting system 500 is such that the case orienting system 500 may be swapped with a conveyor section having a standard (i.e., non-reorienting for a max accepted case size of the system) length of about 30 in (about 740 mm); although in other aspects the length 599 of the case orienting system 500 may be substantially the same as any suitable standard (i.e., non-reorienting for a max accepted case size of the system) length of conveyor section so that the case orienting system 500 may be swapped or is otherwise interchangeable with a standard (i.e., non-reorienting for a max accepted case size of the system) length conveyor section.

As will be described in greater detail herein, the case orienting system 500 includes a traverse transport or conveyor section 510 and a bias support or pusher plate section 520. Each of the traverse transport 510 and bias support 520 are independently movable relative to each other so as to effect a controlled (e.g., substantially free of case jostling) case transfer from, for example, the bias support 520 to the traverse transport 510. The controlled transfer of a case unit from the bias support 520 to the traverse transport 510 reorients (e.g., rotates or otherwise pivots) the case unit by, for example, about 90° relative to a case transfer plane 390 of the in/out case conveyor 150.

Referring again to FIG. 1, in accordance with aspects of the disclosed embodiment the warehouse system 100WS includes a storage and retrieval system 100 that may operate in a retail distribution center or warehouse to, for example, fulfill orders received from retail stores for case units. In one example, the case units may be cases or units of goods not stored in trays, on totes or on pallets (e.g., uncontained). In other examples, the case units may be cases or units of goods that are contained in any suitable manner such as in trays, on totes or on pallets. It is noted that the case units may include cased units of goods (e.g., case of soup cans, boxes of cereal, etc.) or individual goods that are adapted to be taken off of or placed on a pallet. In accordance with the embodiments, shipping cases for case units (e.g., cartons, barrels, boxes, crates, jugs, or any other suitable device for holding case units) may have variable sizes and may be used to hold case units in shipping and may be configured so they are capable of being palletized for shipping. It is noted that when, for example, bundles or pallets of case units arrive at the storage and retrieval system 100 the content of each pallet may be uniform (e.g., each pallet holds a predetermined number of the same item—one pallet holds soup and another pallet holds cereal) and as pallets leave the storage and retrieval system 100 the pallets may contain any suitable number and combination of different case units (e.g., each pallet may hold different types of case units—a pallet holds a combination of soup and cereal). In the embodiments the storage and retrieval system 100 described herein may be applied to any environment in which case units are stored and retrieved.

The storage and retrieval system 100 may be configured for installation in, for example, existing warehouse structures or adapted to new warehouse structures. In the aspects of the disclosed embodiment, the storage and retrieval system 100 may include one or more in-feed transfer station 170 and one or more out-feed transfer station 160, in/out case conveyors 150A, 150B (generally referred to as in/out case conveyors 150), a storage structure array 130, and a number of autonomous vehicular transport robots 110 (referred to herein as "bots"). In the aspects of the disclosed embodiment the storage and retrieval system 100 may also include robot or bot transfer stations, as described in U.S. Pat. No. 9,096,375 issued on Aug. 4, 2015 the disclosure of which is incorporated by reference herein in its entirety. In the embodiments the bot transfer stations may provide an interface between the bots 110 and the in/out case conveyors 150 such that case units can be indirectly transferred between the bots 110 and the in/out case conveyors 150 through the bot transfer stations. In the embodiments case units may be transferred directly between the bots 110 and the in/out case conveyors 150.

The storage structure array 130 may include multiple levels of storage rack modules that form a storage array of storage locations 130SL for case units, each storage location 130SL of which is arranged for storage of at least one case unit at each storage location 130SL. In one aspect, each level of the storage structure array 130 includes respective storage/picking aisles 130A, and transfer decks 130B for transferring case units between any of the storage areas of the storage structure array 130 and any shelf of any in/out case conveyors 150. The storage aisles 130A, and transfer decks 130B are also configured to allow the bots 110 to traverse the storage aisles 130A and transfer decks 130B for placing case units into picking stock and to retrieve ordered case units, where the case units are stored or otherwise held in the storage aisles 130A and/or on the transfer deck 130B in storage locations 130SL.

The bots 110 may be any suitable bots capable of carrying and transferring case units throughout the storage and retrieval system 100. Suitable examples of bots can be found in, for exemplary purposes only, U.S. Pat. No. 8,425,173 issued on Apr. 23, 2013, U.S. Pat. No. 9,561,905 issued on Feb. 7, 2017, U.S. Pat. No. 8,965,619 issued on Feb. 24, 2015, U.S. Pat. No. 8,696,010 issued on Apr. 15, 2014, U.S. Pat. No. 9,187,244 issued on Nov. 17, 2015; U.S. patent application Ser. No. 13/326,952 (which is non-provisional of U.S. Ser. No. 61/423,365 filed on Dec. 15, 2010) entitled "Automated Bot with Transfer Arm" filed on Dec. 15, 2011; and U.S. Pat. No. 9,499,338 issued on Nov. 22, 2016, the disclosures of which are incorporated by reference herein in their entireties. The bots 110 may be configured to place case units, such as the above described retail merchandise, into picking stock in the one or more levels of the storage structure array 130 and then selectively retrieve ordered case units for shipping the ordered case units to, for example, a store or other suitable location.

The in-feed transfer stations 170 and out-feed transfer stations 160 may operate together with their respective in/out case conveyors 150A, 150B for bi-directionally transferring case units to and from one or more levels of the storage structure array 130 effecting infeed of the case units into the storage structure array 130 and output of the case units from the storage structure array 130. It is noted that while the in-feed transfer stations 170 and the outfeed transfer stations 160 (and their respective in/out case conveyors 150A, 150B and palletizer/depalletizer cells 10A, 10B) are described as being dedicated inbound (e.g., in-feed) transfer stations 170 and dedicated outbound (e.g., out-feed) transfer stations 160, in the aspects of the disclosed embodiment each of the transfer stations 170, 160 may be used for both inbound and outbound transfer of case units from the storage and retrieval system 100. It is noted that while in/out case conveyors are described herein, the conveyors may be any suitable conveyors (including any suitable transport path orientation, such as vertical and/or horizontal conveyor paths) or transfer/picking devices having any suitable transport path orientation.

Figure 2:
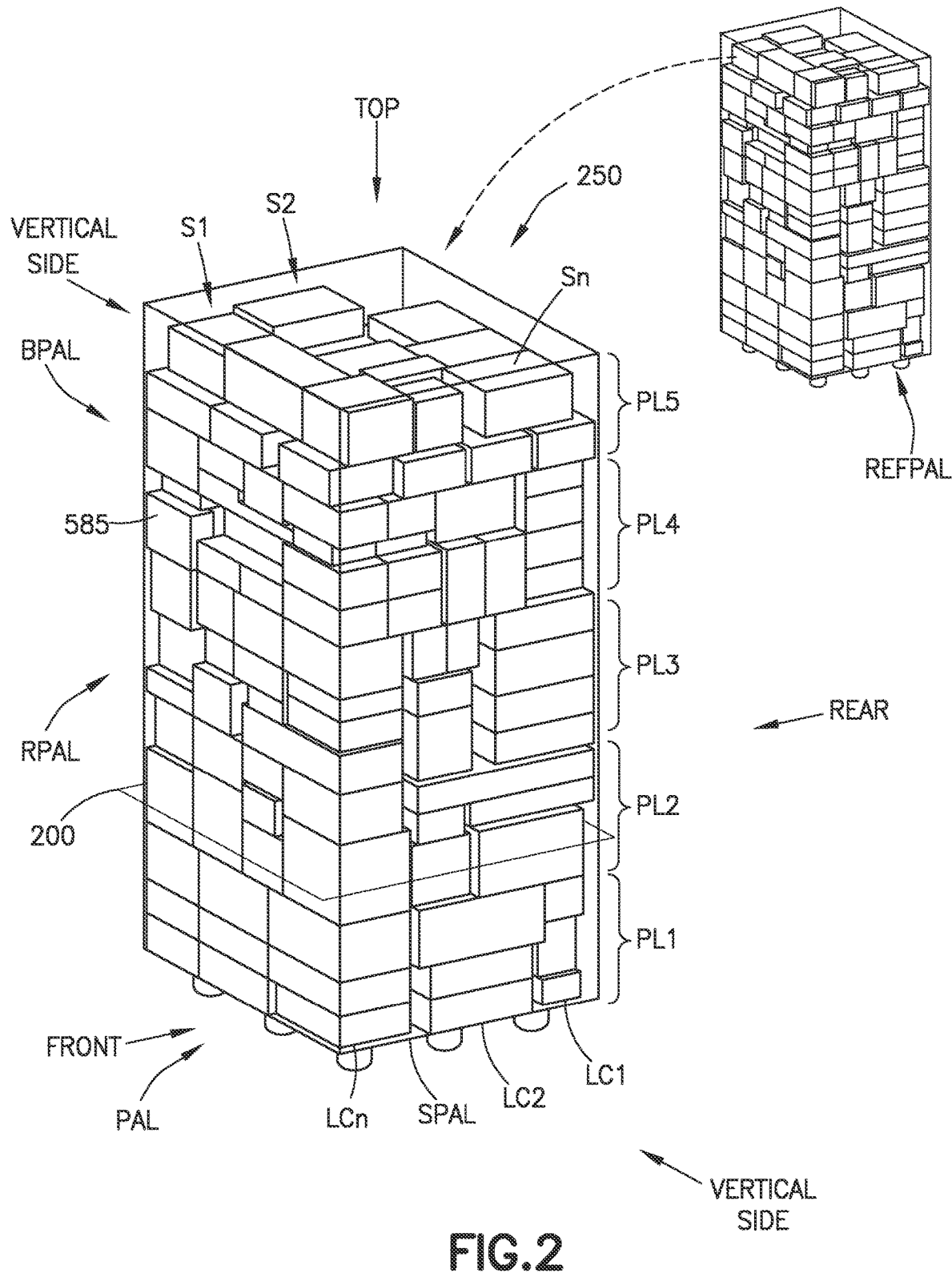
FIG. 2 is a schematic illustration of a pallet load in accordance with aspects of the disclosed embodiment.

In one aspect, each of the in-feed transfer stations 170 and the out-feed transfer stations 160 include a respective in/out case conveyor 150A, 150B and a respective palletizer/depalletizer cell 10A, 10B. As described above, the one or more of the in/out case conveyor 150A, 150B (and/or palletizer/depalletizer cells 10A, 10B) may include a case orientation system 500 as will be further described herein. In one aspect, the palletizer/depalletizer cells 10A, 10B are automated cells each being configured to receive loaded pallets (such as with uniform or mixed case units or products) from, for example, a pallet load in 175 area which may include an in-out loaded pallet conveyor 175C (illustrated in FIG. 1 as an input conveyor) and/or build a loaded pallet (such as with uniform or mixed case units or products) for transport to, for example, a pallet load out 180 area which may include an in-out loaded pallet conveyor 180C (illustrated in FIG. 1 as an output conveyor). In one aspect, the conveyors 175C, 180C are each connected to the storage structure array 130 and are configured so as to bi-directionally transport loaded pallets in an input direction towards the storage structure array 130, and in a different output direction away from the storage structure array 130. In one aspect, the conveyors 175C, 180C may each include a conveyor arrangement with a distributed conveyor bed arranged to form a conveying path or in other aspects, the conveyors 175C, 180C may be discrete transport units such as, for example, a fork lift/pallet truck. Suitable examples of automated palletizer/depalletizer cells 10A, 10B may be found in U.S. patent application Ser. No. 16/035,204 filed on Jul. 13, 2018 (entitled "Apparatus and Method for Building a Pallet Load"); U.S. patent application Ser. No. 15/235,254 filed on Aug. 12, 2016 (entitled "System and Method for Palletizing"); and U.S. Pat. No. 8,965,559 issued on Feb. 24, 2015, the disclosures of which are incorporated herein by reference in their entireties. Each palletizer/depalletizer cell 10 includes one or more robotic case manipulators 14, which may also be referred to articulated robots or robots. The one or more robotic case manipulators 14 are configured, as described herein, so as to transport and place the pallet load article units 585 (also referred to herein as cases or case units) serially onto a pallet support so as to build the pallet load 250 on a pallet building base 301 (see FIG. 3).

Where the palletizer/depalletizer cell 10 functions in an output role as a palletizer, pallet load article units 585, that can be of various sizes, arrive at the palletizer cell 10 via the in/out case conveyors 150B, are picked by one of the robotic case manipulators 14 and placed on the pallet PAL as will be described herein. Where the palletizer/depalletizer cell 10 functions in an output role as a palletizer, a full pallet PAL (see FIG. 2) made from a variety of case units is ready to be picked up by a forklift from the palletizer cell 10 for conveyance to a pallet load out 180 area. Where the palletizer/depalletizer cell 10 functions in an input role as a depalletizer, a full pallet (which may be similar to pallet PAL and formed of homogenous or mixed cases) made from a variety of pallet load article units 585 is transferred to the depalletizer cell 10 in any suitable manner, such as a fork lift, from a pallet load in 175 area. The one or more robotic case manipulators 14 pick the pallet load article units 585 (see FIG. 2) from the pallet PAL (see FIG. 2) for transfer into the storage structure array 130.

In one aspect, each in-feed transfer station 170 forms, a case input path Ip where the palletizer/depalletizer cell 10A depalletizes case units, layer by layer, or otherwise depalletizes the case units into single case units from standard pallets (e.g., homogenous pallets having a stability suitable for automatic engagement of a pallet layer by an automatic layer interface unit, such as the product picking apparatus 14). The palletizer/depalletizer cell 10A is in communication with a transport system of the automated storage and retrieval system 100, such as an in/out case conveyor 150A so as to form an integral input system (e.g., the in-feed transfer station 170) that feeds case units 585 to the automated storage and retrieval system 100. Each in-feed transfer station 170 defines the case input path Ip that is integrated with the automated storage and retrieval system 100 and warehouse management system 199, where the warehouse management system 199 includes any suitable controller 199C configured with any suitable non-transitory program code and memory to manage, at least, case unit input to the storage structure array 130B, case unit storage distribution within the storage structure array 130B and case unit retrieval from the storage structure array 130B, case unit inventory/replenishment and case unit output.

In one aspect, each case unit input path Ip includes at least one corresponding case unit inspection cell 142 in communication with the warehouse management system 199. In one aspect, the at least one corresponding case unit inspection cell 142 may be any suitable inspection cell including any suitable volumetric inspection, such as with a multi-dimensional light curtain, imaging systems and/or any other suitable sensing/sensor arrangement configured to detect case unit defects and identify the case units 585 for, e.g., inventory, transport sequencing, storage distribution and sequencing the case unit 585 for output from the storage structure array 130B. As may be realized, the case unit inspection cell 142 may also be configured to identify an orientation of the case units 585 passing through the case unit inspection cell 142 so as to determine if a height of the case unit 585 exceeds a predetermined height of the storage structure 130.

For exemplary purposes only, the storage structure 130 may be configured to store and transport case units 585 having dimensions between about 5 in (about 127 mm) (high)×about 6.5 in (about 165 mm) (long)×about 5 in (about 127 mm) (wide) and about 24 in (about 610 mm) (high)×about 20 in (about 508 mm) (long)×about 16 in (about 406 mm) (wide) (referred to herein as max accepted case size for description purposes only; while in other aspects the storage structure 130 may be configured to store and transport case units 585 having any suitable dimensions. A case unit 585 may be placed on a conveyor corresponding to the input path Ip, by for example, palletizer/depalletizer cell 10A where the case unit is about 24 in (about 610 mm) high, about 20 in (about 508 mm) long and about 16 in (about 406 mm) wide. Also for exemplary purposes, the storage structure 130 may have storage locations 130SL having a height of about 24 in (about 610 mm) (e.g., not high enough to fit a case unit 585 having a height of about 24 in (610 mm) without interference); while in other aspects, the storage locations 130SL of the storage structure 130 may be configured to store case units 585 having any suitable size. The case unit inspection cell 142 may be configured to identify case units 585 as either a pass through case unit 586 (i.e., a case unit that travels along the traverse axis 595 and passes through the case orienting system 500 without being reoriented) or a reorient case unit 587 that is to be reoriented (i.e., a "to be reoriented case unit") by the case orienting system 500 (as described in greater detail herein) so that the height of the case unit becomes about 20 in (about 508 mm), the length becomes about 24 in (about 610 mm), and the width remains about 16 in (about 406 mm) (i.e., the case unit is to be rotated by about 90° about one axis) so that the height of case unit is less than the predetermined height of the storage locations 130SL of the storage structure 130.

In one aspect, as noted above, the palletizer/depalletizer cell 10A may be fully automatic so as to break down or decommission layer(s) from a pallet unloading at the palletizer/depalletizer cell 10A. It is noted that, referring to FIG. 2, the term decommission refers to the removal of a pallet layer PL1, PL2, PL3, PL4, PL5 (in whole or in part) from a pallet PAL so that each pallet load article unit 585 is removed from the layer PL1, PL2, PL3, PL4, PL5 at a predetermined level 200 (which may correspond to a decommissioning/commissioning level or transfer plane) of the pallet PAL so that the pallet PAL is indexed to a next level of the pallet PAL for removal of the next layer PL4-PL1 (in whole or in part) corresponding to the next level of the pallet PAL.

In one aspect, the palletizer/depalletizer cell 10A is configured to decommission the layers PL1, PL2, PL3, PL4, PL5 so that the decommissioning is synchronous or otherwise harmonized (e.g., matched with) by the warehouse management system 199 with a predetermined rate of case unit flow or feed rate, established by the warehouse management system 199, in the automated storage and retrieval system 100. For example, in one aspect, the warehouse management system 199 is configured to set and/or monitor a predetermined rate of case unit flow within the automated storage and retrieval system 100. For example, the warehouse management system 199 monitors and manages the automated systems of the automated storage and retrieval system 100 (such as, e.g., the in/out case conveyors 150A, 150B, bots 110 and palletizer/depalletizer cells 10A, 10B), where each of the automated systems, or one or more of automated systems have a given transaction time (such as a time/period to effect a basic unit of transport or transfer of cases, e.g., to transfer a case unit on/off the in/out case conveyor 150 to a pick/place station, or lift a case unit a predetermined distance, or bot transfer pick/place on a storage location, a time to transfer a pallet layer to or from a pallet, etc.) that in effect, singularly or in combination define, under control of the warehouse management system 199 or any other suitable controller of the automated storage and retrieval system 100 (e.g., bot controllers, conveyor controllers, palletizer/depalletizer controllers, etc.), the predetermined rate of case unit flow in the automated storage and retrieval system 100 established by the warehouse management system 199. For example, the controller 199C of the warehouse management system 199 is communicably connected to the in-out case conveyor(s) 150A, 150B so that the in-out case conveyor(s) 150A, 150B bi-directionally transport the case units to and from the storage structure array 130 at a predetermined case feed rate. The controller 199C may also be communicably connected to a palletizer-depalletizer cell 10A, 10B corresponding to the in-out case conveyor(s) 150A, 150B so that the layer commissioning and decommissioning of the palletizer/depalletizer cell 10A, 10B, which are respectively substantially continuous, matches the predetermined case feed rate. While the aspects of the disclosed embodiment are described herein with respect to a warehouse system 100WS having automated storage and retrieval system 100 with automated transport systems, the aspects of the disclosed embodiment are also applicable to distribution facilities having any suitable transport systems such as both automated and manual transport systems or to wholly manual transport systems.

In one aspect, each out-feed transfer station 160 forms, a case output path Op where the palletizer/depalletizer cell 10B palletizes case units, layer by layer onto pallets PAL such as with an automatic layer interface unit, such as the one or more robotic case manipulators 14. In one aspect, the pallets PAL may be formed as standard pallets (e.g., homogeneous case units) or as mixed pallets, such as described in U.S. Pat. No. 9,856,083 issued on Jan. 2, 2018 the disclosure of which is incorporated herein by reference in its entirety.

In one aspect, the palletizer/depalletizer cell 10B is in communication with a transport system of the automated storage and retrieval system 100, such as an in/out case conveyor 150B so as to form an integral output system (e.g., the out-feed transfer station 160) that receives case units from the automated storage and retrieval system 100 for placement on pallets according to any suitable case out order sequence. For example, as described above, pallet load article units 585 routed to the one or more robotic case manipulators 14 are transferred to the pallet PAL by the end effector of the one or more robotic case manipulators 14, with the pallet load article units 585 (output case units) being arranged in a predetermined sequence established by the warehouse management system 199, layer by layer (noting that the layer may cover the pallet in whole or in part) to form a standard output pallet load.

Each out-feed transfer station 160 defines the case output path Op that is integrated with the automated storage and retrieval system 100 and warehouse management system 199, where the warehouse management system 199 includes any suitable controller 199C configured with any suitable non-transitory program code and memory to manage the operation of the warehouse system 100WS, including case unit output from the storage structure array 130B, as described herein. In one aspect, each case unit output path Op includes at least one corresponding case unit inspection cell 142 (as described above) in communication with the warehouse management system 199. In one aspect, as noted above, the palletizer/depalletizer cell 10B may be fully automatic so as to build or commission layer(s) to a pallet loading at the palletizer/depalletizer cell 10B. It is noted that, referring to FIG. 2, the term commission refers to the construction of a pallet layer PL1, PL2, PL3, PL4, PL5 (in whole or in part) to a pallet PAL so that each pallet load article unit 585 is inserted to the layer PL1, PL2, PL3, PL4, PL5 at a predetermined level 200 (which may correspond to a decommissioning/commissioning level or transfer plane) of the pallet PAL until the pallet layer PL1, PL2, PL3, PL4, PL5 is formed so that the pallet PAL is indexed to a next level of the pallet PAL for building of the next layer PL2-PL5 (in whole or in part) corresponding to the next level of the pallet PAL. In one aspect, the palletizer/depalletizer cell 10B is configured to commission the layers PL1, PL2, PL3, PL4, PL5 so that the commissioning is synchronous or otherwise harmonized (e.g., matched with) by the warehouse management system 199 with a predetermined rate of case unit flow or feed rate, established by the warehouse management system 199, in the automated storage and retrieval system 100 in a manner substantially similar to that described above with respect to the decommissioning of the layers PL1, PL2, PL3, PL4, PL5 where the warehouse management system 199 manages case unit retrieval order and the sequence of mixed case unit output to load out sequence of the mixed case unit pallet load, and other associated aspects of output such as inventory reconciliation. In one aspect, as described herein, the case unit inspection cell 142 and a case orienting system 500 may be disposed in the case unit output path Op to effect reorienting case units that are picked by the robotic case manipulators 14 for palletization, where the case units are reoriented by the case orienting system 500 according to any suitable predetermined pallet building scheme (e.g., to form stable stacks of cases, to pack case units on the pallet with minimized gaps between the palletized case units, etc.).

Figure 3A:
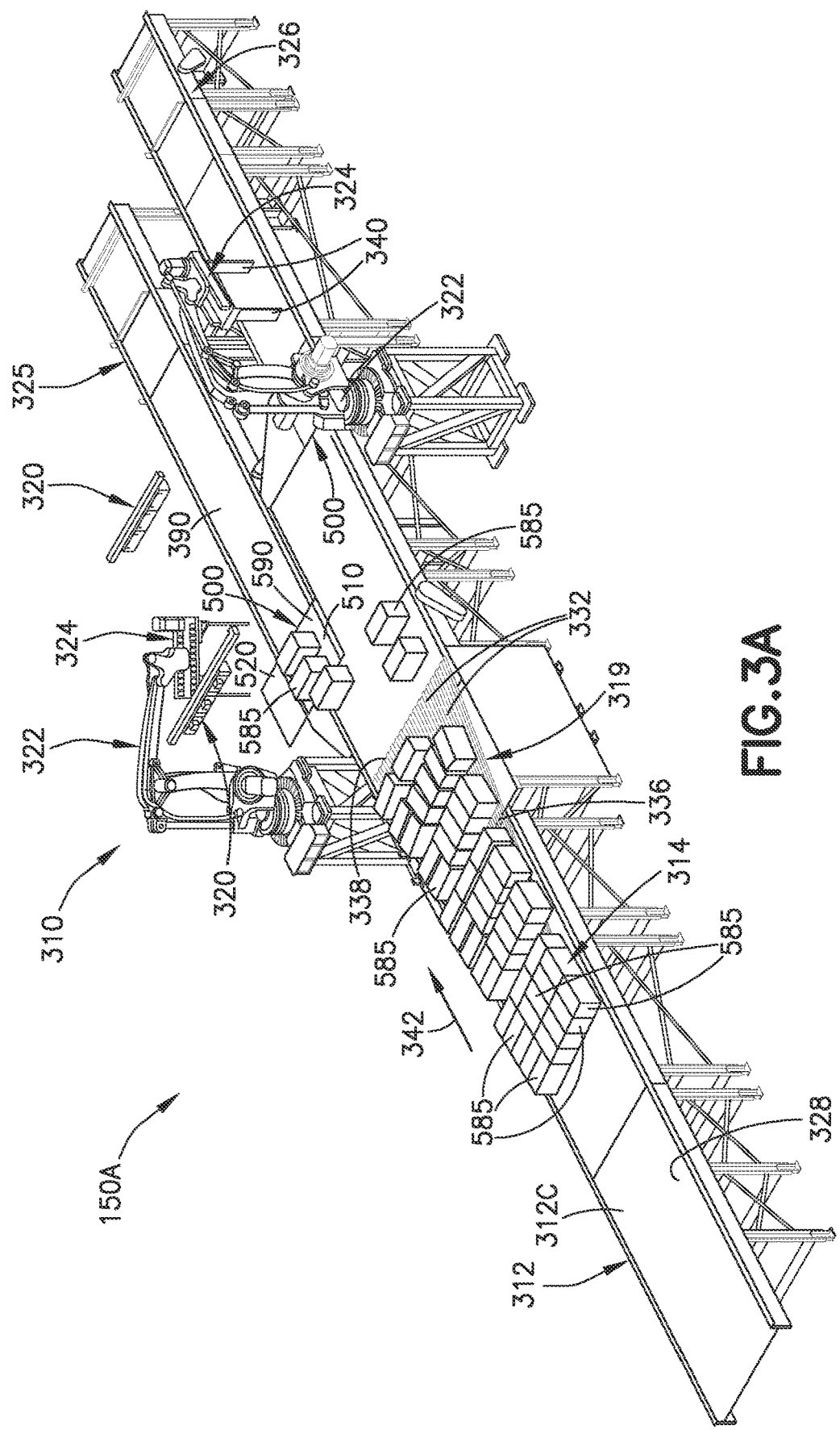
FIG. 3A is a schematic perspective view of a portion of the distribution facility of FIG. 1 in accordance with aspects of the disclosed embodiment.
Figure 3B:
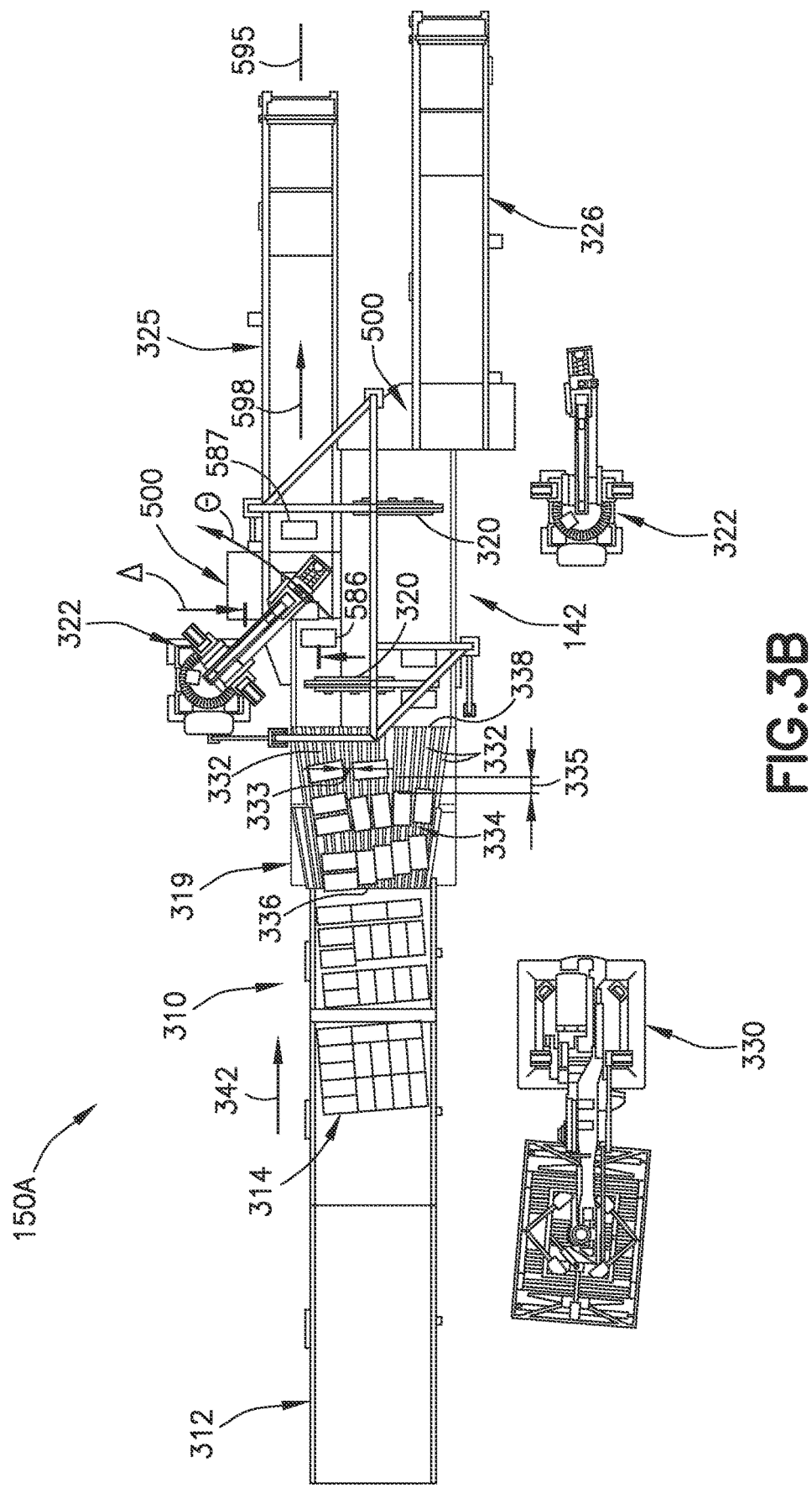
FIG. 3B is a schematic top view of a portion of the distribution facility of FIG. 1 in accordance with aspects of the disclosed embodiment.
Figure 6A:
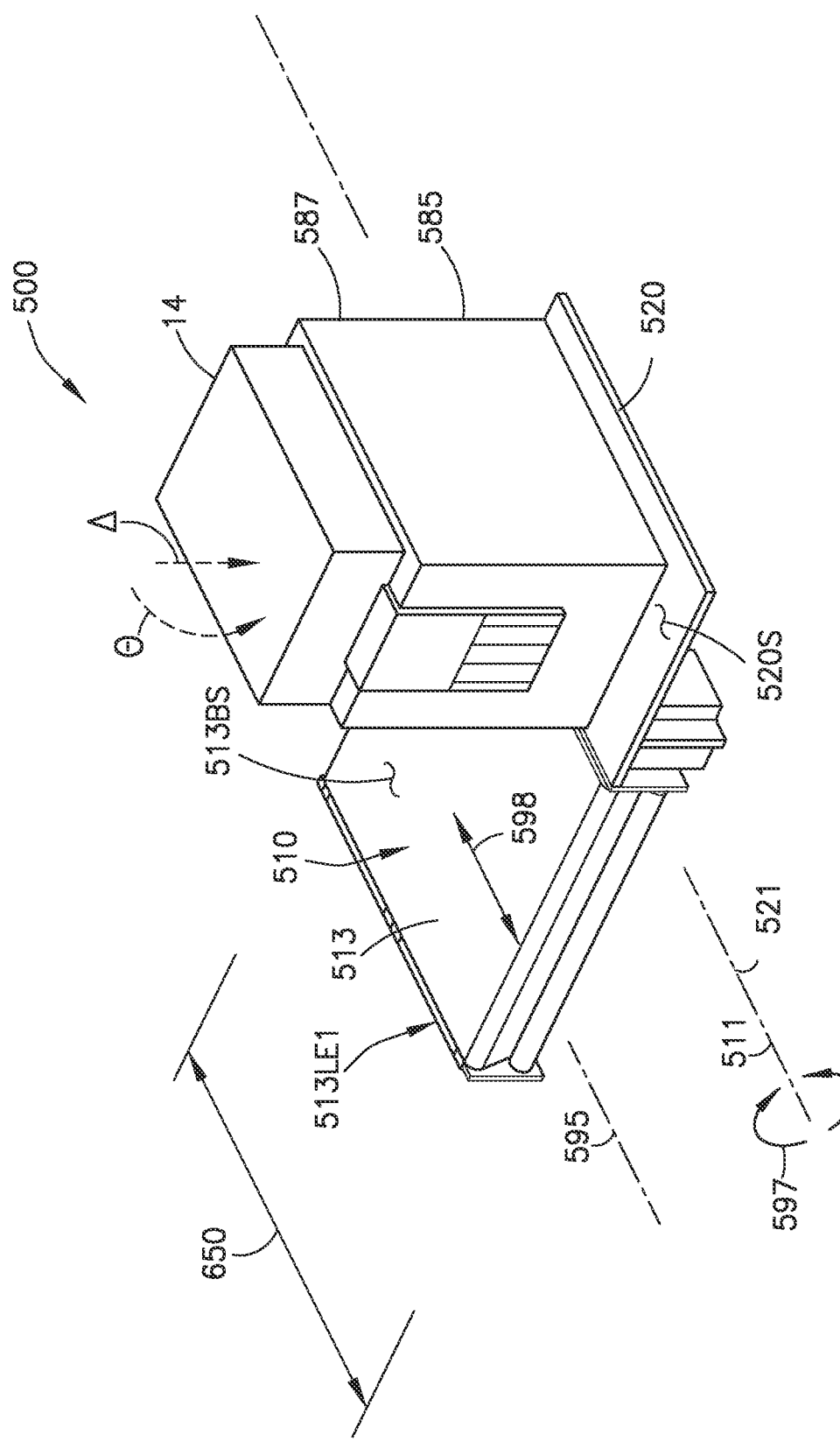
Figure 6B:
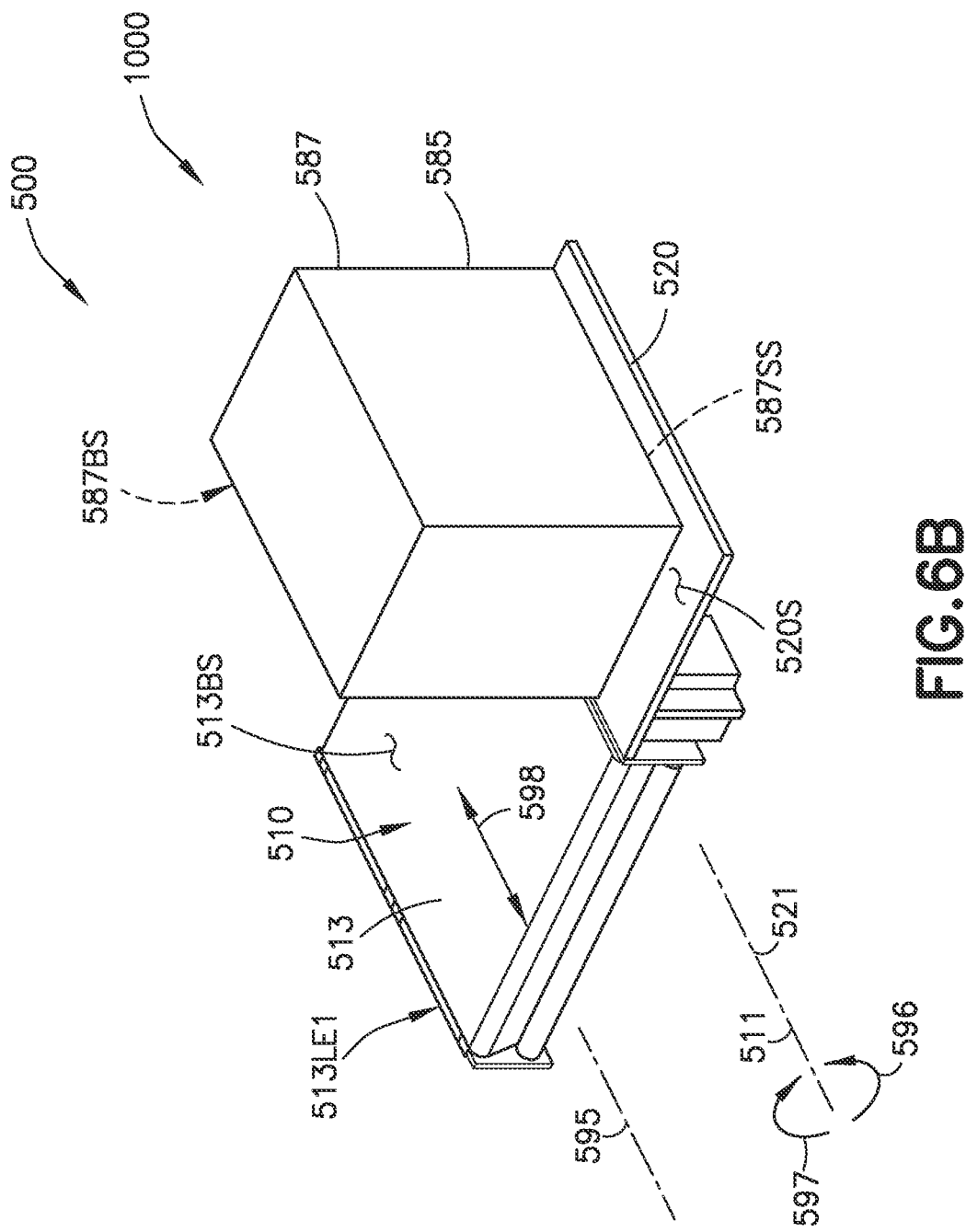
Figure 6E:
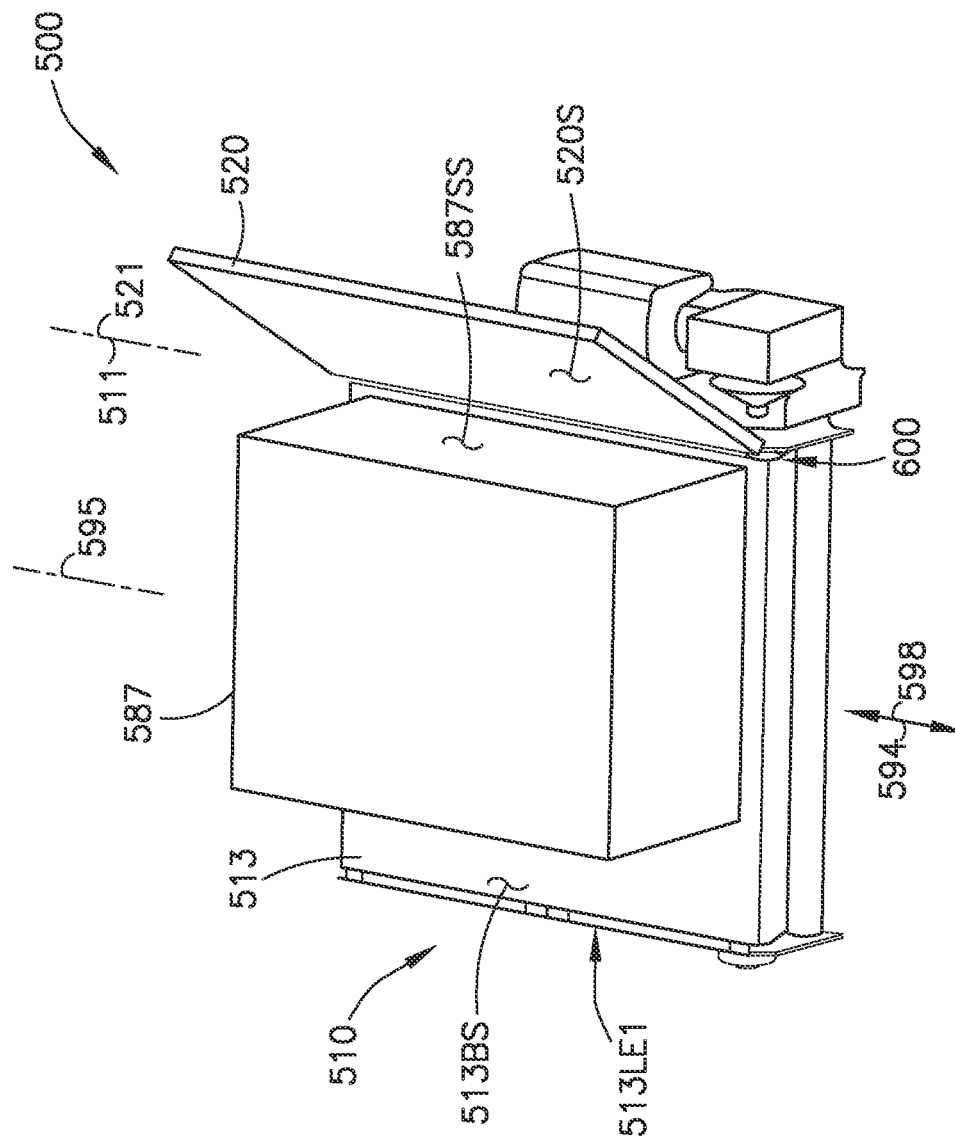
Figure 6F:
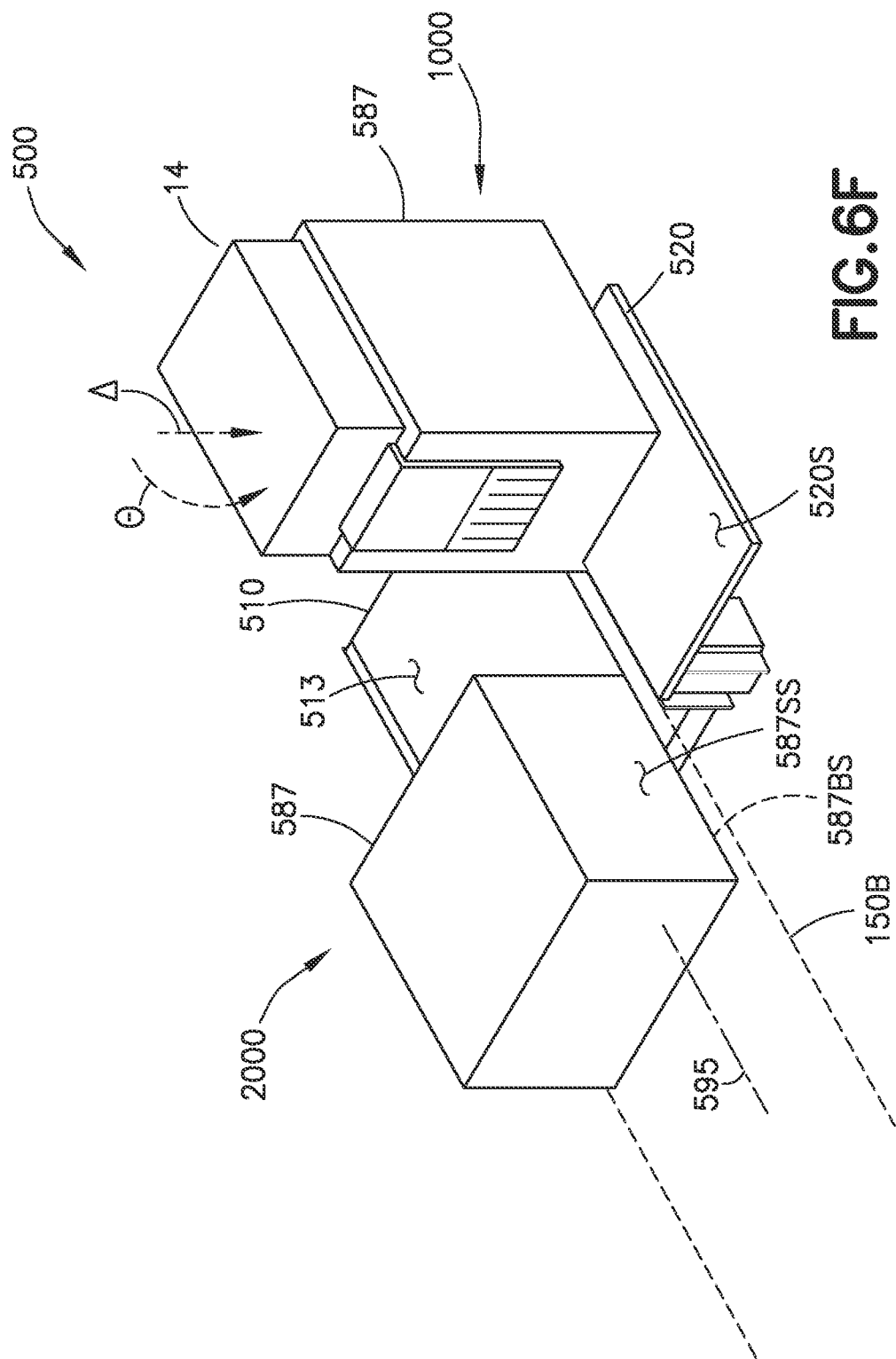

Referring to FIGS. 3A and 3B, a portion of the in/out case conveyor 150A is illustrated and forms an input to the storage structure 130 that includes the case orienting system 500. The in/out case conveyor 150A includes a singulator 310. A suitable example of a singulator can be found in, for example, U.S. Pat. No. 9,359,150 issued on Jun. 7, 2016, the disclosure of which is incorporated herein by reference in its entirety. As an example, the singulator 310 includes a layer drop zone 312, a layer break-up system 319, a case unit inspection cell 142 (e.g., such as described above), two robots 322, and two output stations. The layer drop zone 312 is configured to receive a layer 314 of case units 585 from a robot 330 of palletizer/depalletizer cell 10A or any other suitable mechanized case transfer device (e.g., fork lift) or a human. The layer break-up system 319 is positioned downstream from the layer drop zone 312 and is configured to separate the layers of case units placed on the layer drop zone 312 by the robot 330. The case unit inspection cell 142, in this aspect, includes two arrays of sensors 320 that locates and characterizes (e.g., size, orientation, etc., as described above) each of the case units 585. Each of the two robots 322 (though two robots are shown here for exemplary purposes, the in/out case conveyor system may have any desired number of one or more bots) includes an end of arm tool 324 that is configured to pick and place at least one case unit for transferring the case units from one location to another location as described herein. Here, the two output stations respectively form an output conveyor 325 and a reject conveyor 326; however, in other aspects a single output conveyor may be provided. The output conveyor 325 and the reject conveyor 326 are both positioned downstream from the layer break-up system 319 and comprise linear conveyors configured to receive singulated (e.g., separated for individual transport) case units. The output conveyor 325 and the reject conveyor 326 may be roller conveyors, belt conveyors, or any other suitable conveyor that is motorized or un-motorized. The output conveyor 325 extends along the traverse axis 595 and includes the case orienting system 500. Case units 585 traverse along the output conveyor 325 and are identified by the case unit inspection cell 142. As described above, case units 585 are generally identified as pass through case units 586 and reorient case units 587. The pass through case units 586 travel along the output conveyor 325 (i.e., along the traverse axis 595) in a pass through case traverse direction 598. Case units identified as reorient case units 587 are reoriented by the case reorient system 500 (as will be further described below) before continuing along the output conveyor 325 (i.e., along the traverse axis 595). The case orienting system 500 is a compact system, sized and shaped commensurate with the max accepted case size and effect the reorientation and traverse through the case orienting system 500 within an envelope 650 (FIG. 6A) commensurate with the max accepted case size for the storage and retrieval system 100, as will be described further below.

The layer drop zone 312 includes a motorized conveyor 312C that is configured to receive, from the depalletizer/depalletizer cell 10A, a full pallet layer 314 of case units 585 thereon. The motorized conveyor 312C is configured to transfer the pallet layer 314 in direction 342 to the layer break-up system 319. The conveyor 312 may be any suitable conveyor including, but not limited to, a roller conveyor, a belt conveyor, or any other suitable conveyor having a surface 328 wide enough to receive a full pallet layer of typical size and that is motorized to transfer the full pallet layer 314 to the layer break-up zone 319. In one aspect, the conveyor 312C is not motorized and any suitable pusher mechanism (e.g., human or automated) is used to move the layer 314 along the conveyor 312C. In still another aspect, the full pallet layer 314 may be placed substantially directly received by the layer beak up system 319.

For exemplary purposes only a typical layer size (width×length) is about 101.6 cm×about 121.9 cm (about 40"×about 48"); however, in other aspects, the pallet layer may have and the surface 328 may be configured to receive a pallet layer having any suitable size. For example, the layer drop zone 312 and/or the layer beak up system 319 of the singulator 310 may be configured to receive a layers having sizes that are between about 81.3 cm×about 101.6 cm (about 32 in×about 40 in) and about 111.8 cm×about 132.1 (about 44 in×about 52 in). In other aspects, the singulator 310 and/or the layer drop zone 312 may be configured to receive a layers having sizes that are less than about 81.3 cm×about 101.6 cm (about 32 in×about 40 in) and/or greater than about 111.8 cm×about 132.1 (about 44 in×about 52 in). It is noted that the pallet layers may be mixed pallet layers having mixed case units 585 (e.g., case units containing different products), where the case units 585 may have substantially the same or different geometry; while in other aspects the pallet layers may be homogeneous layers having case units containing the same product and having substantially similar geometry.

The layer break-up system 319 is configured to separate or create gaps 333 and 335 between each case unit 585, where the gaps are sufficient to allow the vision system 320 to detect each case unit 585 independently of other case units 585 being transported through the in/out case conveyor 150A. In one aspect, the layer break-up system 319 includes a multi-belt conveyor that has a plurality of diverging motorized belts 332 that together define a tapered conveying surface 334 that directs the case units 585 along diverging paths. The belts 332 are independently driven at the same or different speeds so that lateral and longitudinal gaps 333 and 335 are created between the case units travelling along the belts 332, where the lateral and longitudinal gaps 333, 335 increase from an input side edge 336 of the layer break-up system 319 to an output side edge 338 of the layer break-up system 319. In other aspects, the layer break-up system 319 may have any suitable configuration to effect separation of the case units for identification by the vision system 320, such as for example, one or a combination of independently driven skewed rollers, a multi-belt conveyor, suitable multi-speed conveying mechanism, etc.

As described above, the case unit inspection cell 142, in this aspect, includes two arrays of sensors 320; however in other aspects the case unit inspection station 142 may have any suitable number of sensors. In one aspect, the sensors 320 may be disposed above, for example, an output end of the layer break-up system 319, where the sensors 320 are coupled to a ceiling of the warehouse system 100WS, to a portion of a frame or a gantry of the layer break-up system 319 that extends above the belts 332, or at any other suitable location to effect detection of the case units travelling on the belts 332. The sensors 320 are positioned and configured to acquire an image of the case units 585 located within the case unit inspection cell 142 and/or located on the belts 332 of the break-up system 319. In one aspect, the sensors 320 are configured to acquire an image of the case units 585, where the image includes a depth map that provides three-dimensional view of the case units 585 or any other suitable image/images that provide for at least a determination of dimensions of each case unit 585. The case unit inspection cell is coupled to any suitable computer (such as the controller 199C) configured to receive and process the image(s) acquired by the sensors 320 so as to detect and validate case unit characteristics, locate each case unit 585, and/or calculate case unit coordinates and orientation in a reference frame (e.g., coordinate system) that is known to the robots 322. As described herein, examples of case unit 585 characteristics detected and/or validated by the case unit inspection cell 142 include, but are not limited to, the dimensions and shapes of the case units 585, separation distance between adjacent case units 585, optimal exit vector for the case units 585, colors, writings, logos, signs, and other printings, engravings, etc. on the case units 585 that can be seen from a top and/or perspective view of the case units 585. The validation of the case units 585 may include comparing a three-dimensional model of the case units 585 (such as created by the depth map) to a predetermined model of the case units 585 so as to determine defects of the case units 585 (e.g., damage to the case units, unexpected/incorrect case units, etc.). Predetermined criteria stored for example in a memory of the controller 199C or a memory accessible to the controller 199C may be employed to effect the detection of a defective product.

The robots 322 of the in/out case conveyor 150A may be any suitable transfer robots configured to grip and transfer the case units 585 from one location to another. Each robot 322 may include an end of arm tool 324 configured for handling the products 585 that are introduced into (or removed from) the storage structure 130. The robots 322 are configured to grip and position each case unit 585, based on the identified characteristics of the respective case units 585, onto one of the output conveyor 325 and the reject conveyor 326. For example, information related to a case unit 585 that has been found to be damaged by the case inspection cell 142 is transferred from the layer break-up system 319 and/or the case inspection cell 142 to the reject conveyor 326 by one of the robots 322. The robots 322 may also be configured, based on the identified characteristics of the respective case units 585, to position the respective case units to be reoriented, providing at least a two degrees of freedom (e.g., linear and lateral effect set Δ, yaw θ rotation) shunt path to the case units (see FIGS. 3B and 6A), on the case orienting system 500 included in the in/out case conveyor system 150A so that the case orienting system 500 is compact as will be described in greater detail herein. Moreover, the case orienting system 500 (alone or in cooperation with the respective robot effects reorientation of corresponding case units substantially within the transaction time of the case flow (substantially without disruption of non-orienting case flow of pass through case unit 586 past the case orienting system 500). As may be realized, the gaps 333 and 335 created between the case units 585 by the layer break-up system 319 allow the two robots 322 to grab the case units 585 with their end of arm tool 324. In one aspect, the end of arm tool 324 includes adjustable vertical side plates 340 together that define a clamp. The adjustable vertical side plates 340 are movable towards and away one another to grip and release one or more case units 585. In another aspect, the end of arm tool 324 is a vacuum gripper or any other suitable griping device configured to grip and release case units 585 for transporting the case units 585.

The output of the singulator 310 of the in/out case conveyor 150A is a flow case units 585 positioned on the output conveyor 325 in a desired orientation or in groups according to specific patterns. Examples of such patterns include groups of case units 585 that are assembled according to any suitable pre-defined arrangement, including specific orientations (which orientation satisfy, e.g., at least height limitations of the storage structure 130). Such arranged products are said to be singulated (e.g., separated from a pallet layer and moved individually to a selected area).

Figure 4:
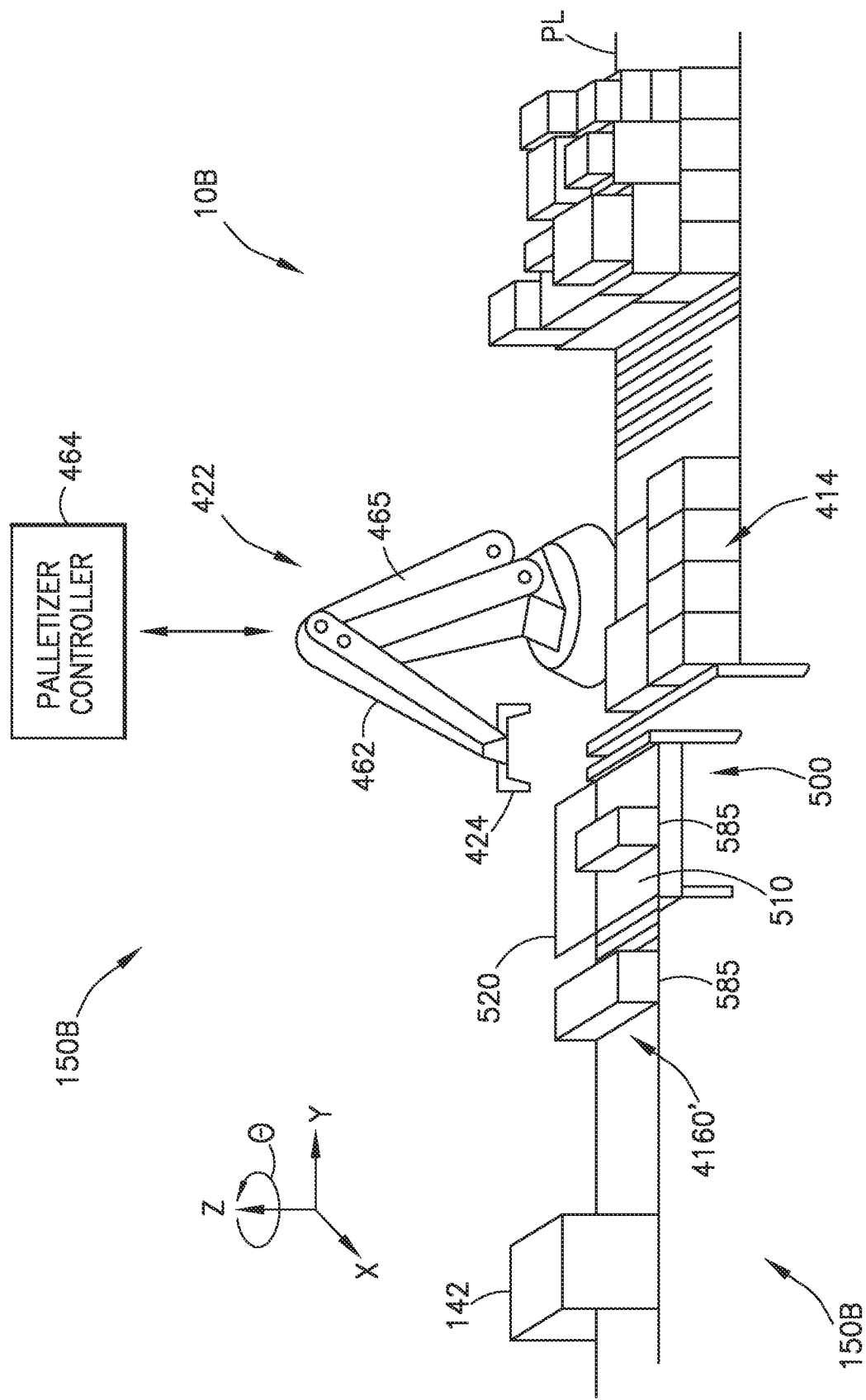
FIG. 4 is a schematic perspective view of a portion of the distribution facility of FIG. 1 in accordance with aspects of the disclosed embodiment.

Referring to FIG. 4, a portion of the in/out case conveyor 150B and palletizer/depalletizer cell 10B are illustrated and form an output from the storage structure 130 that includes the case orienting system 500. Generally the in/out case conveyor 150B may be substantially similar to conveyors 325, 326 described above, where a portion of the in/out case conveyor 150B may be formed by the case orienting system 500. A case unit inspection cell 142 may be disposed along or otherwise coupled to the in/out case conveyor 150B to identify characteristics (such as those characteristics described above) of the case units 585 to effect, at least in part placement of the case units 585 in pallet layers 414.

The palletizer/depalletizer cell 10B includes any suitable robot(s) 422 which may be substantially similar to robots 322 described above. The robot(s) 422 include any suitable end of arm tool 424 (which may be substantially similar to end of arm tool 324 described above) to capture or otherwise grip the case units 585 and move the case units 585 from one location to a desired destination location for building a pallet load PL. In one aspect, the end of arm tool 424 may be capable of 3-D movement (e.g., along x, y, z axis as well as at least θ (yaw rotation)). The end of arm tool 424 (arm tool 324 is similar) x, y motions form the Δshunt path and θ rotation provides case yaw rotation accordingly, substantially within the case orienting system envelope 650. The end of arm tool 424 may be disposed accordingly on a suitable movable chassis 462 of the robot 422 with suitable drives to facilitate case grip motion as desired. The robot 422 shown in FIG. 4 may comprise an articulated arm 465 and the end of arm tool 424 depending from the articulated arm 465. Here again, the arm articulation may be such as to allow desired range of motion of the end of arm tool 424 along the x, y, z axis. The configuration of the palletizer/depalletizer cell 10B and the robot 422 shown in FIG. 4 are exemplary, and in other aspects the palletizer/de-palletizer cell 10B and robot 422 may have any other suitable configurations such as those described in U.S. Pat. No. 8,965,559 issued on Feb. 24, 2015, the disclosure of which is incorporated herein by reference in its entirety. Case grip actuation and movements, including path and trajectory between pick and place locations are determined and commanded by the palletizer controller 464 (which may be in communication with or form a part of controller 199C) in accordance with suitable programming. As may be realized, data related to the end of arm tool 424 picking the case units 585 fed to the palletizer/depalletizer cell 10B by the in/out case conveyor 150B, including for example, case identification, dimensions, pick position or location may be provided by the controller 199C to the palletizer controller 464. Data related to case grip placement of the case units onto the pallet PL such as placement location (for example coordinate locations in the desired reference frames of the pallet load may be determined or provided to the palletizer controller 464 from a pallet load solution generated by a pallet load generator in a manner and in accordance with programming features such as those described in U.S. Pat. No. 8,965,559, the disclosure of which has been previously incorporated by reference herein in its entirety. As seen in FIG. 4, case units 585 corresponding to a respective order (initialized for example via the warehouse management system 199) may be fed to the palletizer/depalletizer cell 10B in a desired sequence. The exemplary configuration in FIG. 4 is shown as having a single out-feed conveyor transporting cases to the palletizer/depalletizer cell 10B, but in other aspects any suitable number of conveyors may be provided to feed the case units corresponding to a respective order to the palletizer/depalletizer cell 10B. The term conveyor is used herein (as noted above) to mean any suitable transport or conveyance capable of transporting the case units along a desired transport path, including for example a movable belt conveyor, roller or rotating bar conveyors, or other suitable transport. The case units 585 are queued and placed as described previously on the feed conveyor(s) of the in/out case conveyor 150B in a desired sequence and may arrive and be fed to the palletizer/depalletizer 10B in the same sequence. The desired case sequence may be for example established or known to the controller 199C and communicated or otherwise shared, along with other related information such as case identity and case dimensions, with the palletizer controller 464 as also noted before. Information relating to the corresponding case units to the respective order may also be communicated to the palletizer controller 464. Hence, the palletizer controller 464 may know the case units making up each respective order and case information (e.g., case dimension, identity, etc.) allowing determination of the pallet load structure with the pallet load generator. By way of example, as shown in FIG. 4, the robot 422 may operate to pick case units 585 from the conveyor in/out case conveyor 150B. In some aspects, the pallet loading may dictate that one or more case units 585 are to be reoriented for placement on the pallet. The to be reoriented case units may be transferred, in any suitable manner, such as by robot 422, to the bias support 520 of the case orienting system 500 for reorientation of the case unit as described herein. The reoriented case may be transferred from the case orienting system 500 to the pallet by the robot 422.

Referring now to FIGS. 3A-3B, 5A-5E, and 6A-6F, the case orienting system 500 will be described in greater detail. The case orienting system 500 is configured to handle max accepted case units 585 (FIG. 5D) or case units having any suitable dimensions (such as those described above) and may be swapped with standard (i.e., non-reorienting for a max accepted case size of the system) length conveyor sections of the in/out case conveyors 150A, 150B (FIG. 1). The case orienting system 500 reorients case units 585 and includes an in-situ case unit extraction for transporting the case units 585 from the case orienting system 500 to downstream conveyor sections (e.g., such as a respective one of the output conveyor 325 section and the reject conveyor 326 section (FIGS. 3A and 3B)) all within the transaction time of the case flow. For example, the case orienting system 500 includes a frame 501, the traverse transport 510 pivotally coupled to the frame 501, and the bias support 520 that is movably coupled to the frame 501. The frame 501 may have any suitable configuration that places a reference datum (e.g., case transfer plane) 590 of the case orienting system 500 substantially co-planer with a case transfer plane 390 of either an upstream and/or downstream conveyor section (see FIG. 3A). The case transfer plane 390 is substantially bound by a reference datum edge 513LE1, 513LE2 that places conveyed case units substantially aligned with the traverse axis 595 defining the traverse direction 598 of the traverse transport 510. The reference datum edge 513LE1, 513LE2 is common for all cases up to max acceptable size which pass through on the traverse axis 595 of the traverse transport 510, and reorient cases 587 as will be described.

The traverse transport 510 includes a traverse frame 512 that is pivotally coupled to the frame 501 about a traverse pivot axis 511. A movable platform 513 is coupled to the traverse frame 501. The movable platform 513 is configured to support cases of predetermined size (such as those described above) that spans substantially across the movable platform 513 (i.e., an area of the substantially continuous movable platform 513 is substantially coincident with an area of a bias surface 587BS of a largest one of the case units 585 (e.g., max accepted case units) handled in the warehouse system or distribution facility 100WS as further described below). The movable platform 513 is configured to support and transport the case units 585 along the traverse axis 595, where the movable platform transports the case units 585 from the case orienting system 500 to, e.g., the downstream conveyor sections. In other aspects, the movable platform, may at least in part, transport the case units 585 to the case orienting system 500 from an upstream conveyor section. In one aspect, the movable platform 513 is substantially continuous and forms a belted conveyor 513B; however, in other aspects, the movable platform may include one or more of a movable belt conveyor (such as a mat-top, chain-top, or other suitable belted conveyor), roller or rotating bar conveyors, or other suitable transport. In one aspect, any suitable conveyor drive system 580 (FIG. 5B) (e.g., drive motor, transmission, etc.) is coupled to the traverse frame 512 and the movable platform 513 for driving/moving the movable platform 513 to effect case transport across the case orienting system 500 in the transverse direction 598.

In one aspect, the movable platform 513 has a span that is commensurate with, e.g., a conveyor of the in/out case conveyors 150A, 150B (i.e., the moveable platform 513 of the case orienting system 500 forms a single or common axis (traverse axis 595) with the respective conveyor of the in/out case conveyors 150A, 150B (see FIG. 3B)). The movable platform 513 is configured to support and transport the pass through case units 586 in a pass through case traverse direction 598 along the traverse axis 595 and the reorient case units 587 in a reoriented traverse direction 594. In one aspect, the reference datum 590 positions the reorient case units 587 so that the reoriented traverse direction 594 is substantially coincident with the pass through case traverse direction 598 upon movement of the traverse transport 510 to be co-planer with the common case support plane 590C. As noted, the edges 513LE1, 513LE2 form an edge of the reference datum 590 for positioning conveyed pass through cases 586 and the reorient case units 587 within, so that the reorient case units 587 are aligned substantially in common with the pass through case unit 586 aligned with the traverse axis 595 defining the traverse direction 598 of the in-out case conveyor 150. The bias support 520 is configured to effect transfer of the reorient case units 587 from the bias support 520 to the substantially continuous movable platform 513 so as to justify the reorient case unit 587 relative to the reference datum 590 between the edges 513LE1, 513LE2 as will be further described below (i.e., the bias support 520 places the reorient case units 587 onto the substantially continuous movable platform 513 in a substantially justified position relative to the edges 513LE1, 513LE2 and substantially aligns the reorient cases unit 587 on the traverse axis 595 defining the traverse direction 598 of the in-out case conveyor 150 (see FIGS. 5D and 5E) substantially coincident with the reorientation action, such that no further justification of the reorient case units 587 is performed to align the reorient case units 587 with the traverse axis 595 post-reorientation.

Figure 5D:
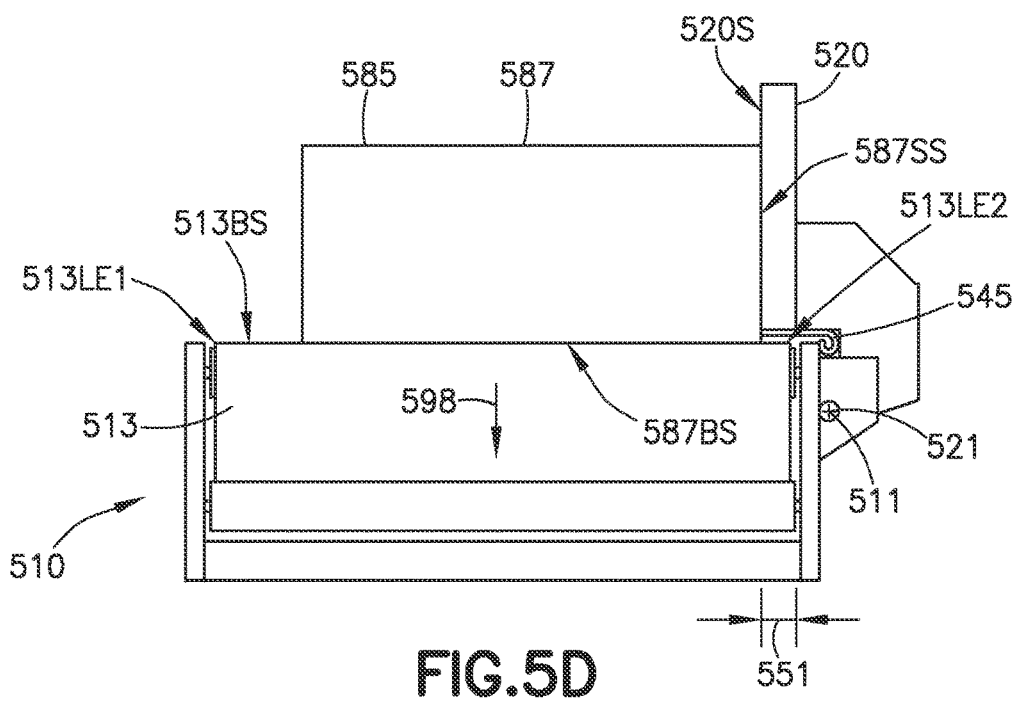
FIGS. 5D-5E are schematic illustrations of a portion of the case orienting system of FIG. 5A in accordance with aspects of the disclosed embodiment.
Figure 5E:
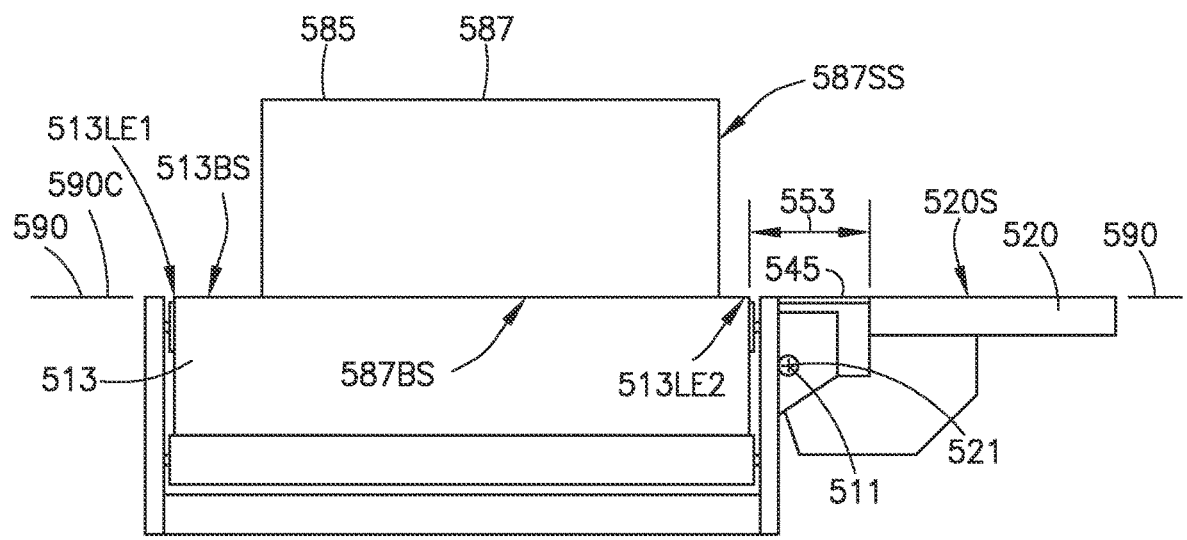

Any suitable conveyor pivoting system 570 may be coupled to both the frame 501 and the traverse frame 512. The conveyor pivoting system 570 may be configured to provide controlled independent pivoting movement of the traverse transport 510 about the traverse pivot axis 511. In one aspect, the conveyor pivoting system 570 includes a biasing member 571 and an actuator 572. The actuator 572 controls pivoting movement (extension) of the traverse transport 510 in direction 597 so as to rotate the traverse transport 510 about the traverse pivot axis 511 towards (and/or away from) the bias support 520. The actuator 572 may also control pivoting movement (retraction) of the traverse transport 510 in direction 596 so as to rotate the traverse transport 510 about the traverse pivot axis 511 away from (and/or toward) the bias support 520. In other aspects, multiple actuators may provide controlled extension and retraction of the traverse transport so as to controllably rotate the traverse transport 510 in both directions 596, 597 about the traverse pivot axis 511. The actuator(s) 572 may be linear actuator(s) or any other suitable actuator(s) that may be driven by respective servo motors 570M or any other suitable motor. In one aspect, the actuator 572 may be driven by a servo motor 570M while in other aspects the actuator 572 is driven by hydraulics or other electric motor, while in still other aspects, the actuator may be driven in retraction by a servo motor and driven in extension by hydraulics or other electric motor where rotational movement of the traverse transport 510 towards the bias support 520 in direction 597 is less precise than rotational movement of the traverse transport 510 in the opposite rotational direction 596. It is noted that a surface 513BS of the movable platform 513 (such as the surface 513BS of the belted conveyor 513B) forms the reference datum (e.g., case transfer/support plane) 590 with the traverse transport 510 in a retracted position as shown in FIGS. 5A and 5E. The biasing member 571 is configured to substantially prevent overloading (e.g., exceeding a working capacity) of the actuator 572. For example, the biasing member 571 may comprise an air spring, coil spring, or other suitable energy absorber that may assist and/or dampen movement of the traverse transport 510 to substantially prevent overloading of the actuator.

The bias support 520 is movably coupled to the frame 501 and is disposed adjacent to or opposing the traverse transport 510 so as to move relative to the frame 501 in opposition to the traverse transport 510. The bias support 520 includes a support/pusher surface 520S that is configured to support the case units 585 in a first orientation 1000 (FIG. 6B) relative to the reference datum 590. For example, the bias support 520 is configured such that a case unit 585 identified by the case unit inspection cell 142 as a reorient case unit 587 may be positioned on the bias support 520 in any suitable manner such as by a palletizing/depalletizing robot, push arm, etc., where a seating surface 587SS (FIG. 6E) of the reorient case unit 587 is engaged and seated on the support surface 520S. For example, the reorient case units 587 may be pushed or picked and placed by the robots 322, 422 or transferred in any other suitable manner to position the respective reorient case unit 587 on the case orienting system 500. The respective reorient case unit 587 may be pushed along the shunt path (e.g., linear and lateral motion effect set Δ, yaw θ rotation (see FIGS. 3B and 6A)) from the traverse transport 510 to the bias support 520 so as to be positioned for reorientation (i.e., the case orienting system 500 is within the space envelop 650 of the robots 322, 422 such that the traverse transport 510 and bias support 520 are within a reach of the robot arms). As noted above, the reorientation action is substantially within the transaction time of the case flow (substantially without disruption of non-orienting case flow past the case orienting system 500). The support surface 520S may be coplanar with the reference datum 590, with the bias support 520 in a retracted position as shown in FIGS. 5A and 5E. The movable platform 513 of the traverse transport 510 and the bias support 520 are configured so as to form a common case support plane 590C, the common case support plane 590C forming at least a portion of the reference datum 590 of the frame 501 (see FIGS. 5A and 5E) so that the reorient case unit 587 supported by the case orienting system 500 may be pushed (such as by robots 322, 422) between the bias support 520 and the traverse transport 510.

In one aspect, any suitable bias support moving system 575 may be coupled to both the frame 501 and the traverse frame 512. The bias support moving system 575 may be configured to provide controlled independent movement of the bias support 520. In one aspect, the bias support moving system 575 is configured to move the bias support 520 relative to the traverse transport 510 so as to cause the reorient case unit 587, supported on the bias support 520, to engage a tipping fulcrum 600 so that an orientation of the reorient case unit 587 changes from the first orientation 1000 to a second different orientation 2000 (i.e., rotates 90°). For example, the reorient case unit 587 with the seating surface 587SS seated on the bias support 520 is caused to be rotated so that the reorient case unit 587 is transitioned to the traverse transport 510. Once transitioned to the traverse transport 510, a bias surface 587BS of the reorient case unit 587 is seated against the movable platform 513 of the traverse transport 510 in the second different orientation 2000 and the seating surface 587SS of the reorient case unit 587 is disengaged from the bias support 520. In one aspect, reorientation of the reorient case unit 587 may occur with the case unit 587 moving in the traverse direction 594 with the bias surface 587BS seated on the movable platform 513; while in other aspects, the reorientation of the reorient case unit 587 may occur with the case unit 587 stopped with the bias surface 587BS seated on the movable platform 513.

In one aspect, the bias support moving system 575 is a pivoting system that includes at least one actuator 576 to pivot the bias support 520 in directions 596, 597 so as to rotate the bias support 520 about a plate pivot axis 521 towards (and away from) the traverse transport 510. In other aspects, more than one actuator may be provided (e.g., an extension and retraction actuator such as described above) to separately control extension and retraction of the bias support 520 so as to controllably rotate the bias support 520 in both directions 596, 597 about the plate pivot axis 521. The actuator(s) 576 may be linear actuators or any other suitable actuators and may be driven by respective servo motors or any other suitable motor. Each of the traverse pivot axis 511 and the plate pivot axis 521 extend along the traverse axis 595. In other aspects, one or more of the traverse pivot axis 511 and the plate pivot axis 521 may extend in a direction that is transverse to the traverse axis 595. In one aspect, the traverse pivot axis 511 and the plate pivot axis 521 are collinear; while in other aspects the traverse pivot axis 511 and the plate pivot axis 521 may be spatially offset from one another.

In one aspect, the bias support 520 is spaced from the movable platform 513 so as to form a gap 533 between the bias support 520 and the movable platform 513. The traverse pivot axis 511 and the plate pivot axis 521 may be located within the gap 533 (e.g., between the traverse transport 510 and the bias support 520) so as to provide substantially interference free independent rotation of one of the traverse transport 510 and the bias support 520 relative to another one of the traverse transport 510 and the bias support 520. In other aspects, the traverse transport 510 and the bias support 520 may have any suitable spatial relationship relative to each other and any suitable configuration so as to provide substantially interference free independent rotation of one of the traverse transport 510 and the bias support 520 relative to another one of the traverse transport 510 and the bias support 520.

In one aspect, the case orienting system 500 includes a pliable support web 545 that is disposed within the gap 533 and coupled to both the bias support 520 and the traverse transport 510 so as to form a traverse surface that extends substantially along the common case support plane 590C. The pliable support web 545 may form a riding surface on which the reorient case units 587 traverse for movement between the bias support 520 and the movable platform 513. As can be seen in FIGS. 5D and 5E, the pliable support web 545 may be constructed of any suitable material (e.g., such as a mat-top conveyor material) and is configured to bend/fold in a space between the bias support 520 and the traverse transport 510, such as when the bias support 520 and the traverse transport 510 are rotated towards each other about the respective traverse pivot axis 511 and the plate pivot axis 521.

Figure 7:
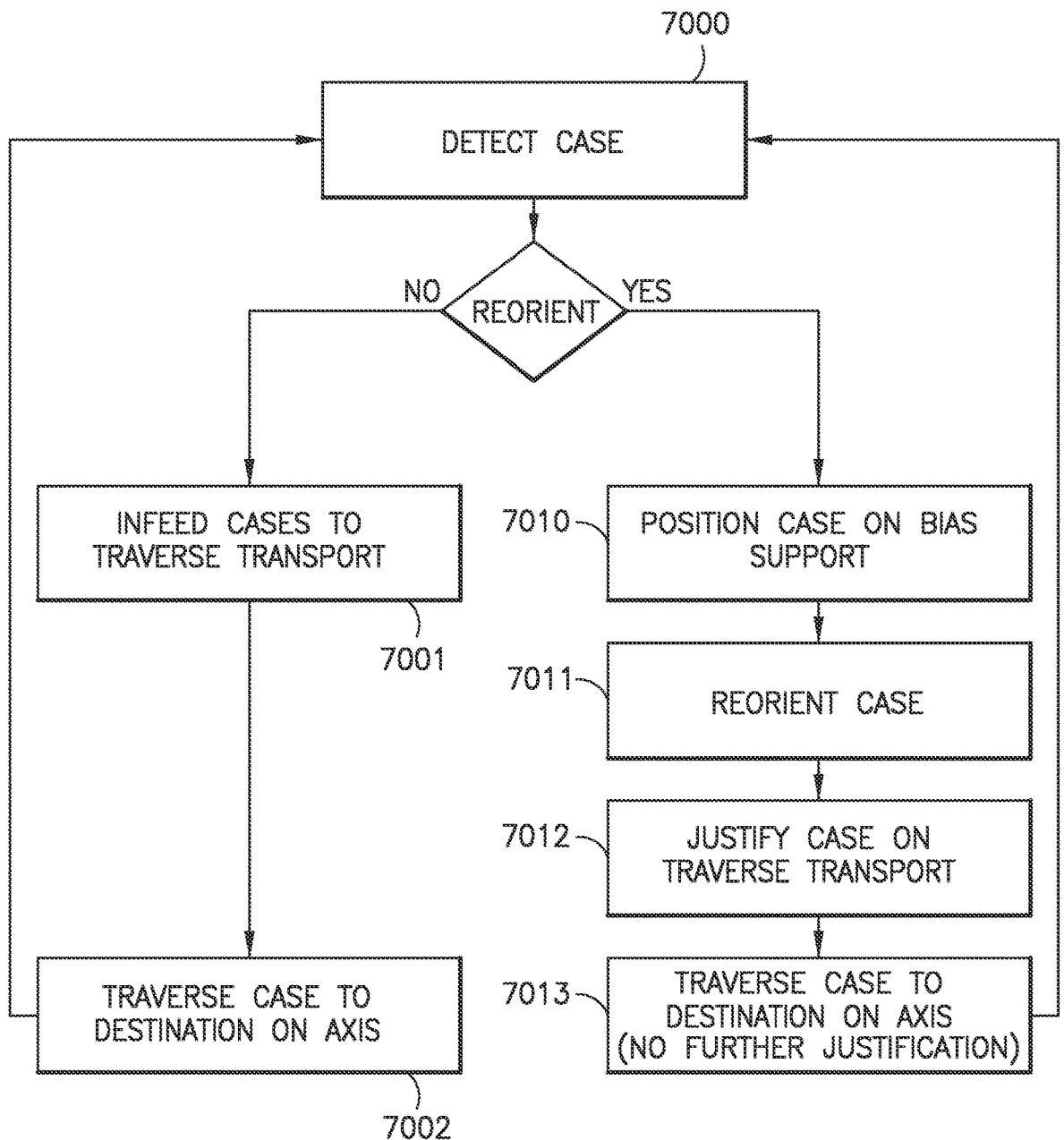
FIG. 7 is a flow chart of a method of automated case orienting in accordance with aspects of the disclosed embodiment.

Referring now to FIGS. 1, 5A, 6A-6F, and 7, an exemplary operation of the case orienting system 500 will be described. In one aspect, a fulfill order is received from, e.g., a retail store for replenishment of case units (while the exemplary operation is described with respect to a fulfill order (i.e., output), the operation is substantially similar to case intake and storage (i.e., input)). The controller 199C of the warehouse system 100WS determines a case unit output scheme to fulfill the order. The ordered case units 585 are identified and registered in any suitable manner to be transferred to an out case conveyor 150B. For example, ordered case units 585 may be identified by the controller 199C for picking from the storage structure 130 of the storage and retrieval system 100. These identified case units 585 (i.e., max accepted case size) may be communicated from controller 199C to one or more bots 110 so that the one or more bots 110 collects the identified case units 585 and transfers the identified case units 585 to the out case conveyor 150. Once the identified case units 585 arrive at the out case conveyor 150B, the identified case units 585 are placed on the out case conveyor 150B (manually or autonomously) to be transferred along the traverse axis 595 to the palletizer cell 10B. On the out case conveyor 150, the identified case units 585 are passed through the case unit inspection cell 142, which is communicably coupled to, e.g., controller 199C, where sensors 320 image the case unit so as to detect each case unit passing through, characterize the case unit (e.g., size, orientation, etc., as described above), and calculate case unit coordinates and orientation in a reference frame (e.g., coordinate system) that is known to the robot manipulator 14. The case unit inspection cell 142 identifies each case unit as either a pass through case unit 586 (i.e., bypass reorientation) or a reorient case unit 587. If a case unit is identified as a pass through case unit 586, the case unit continues being conveyed along the traverse axis 595 of the output conveyor 325 (including the traverse transport 510 of the case orienting system 500) to the palletizer cell 10B (FIG. 7, Block 7001). At the palletizer cell 10B, the case unit is transferred to the pallet by the robot manipulator 14 (FIG. 7, Block 7002).

If the case unit is flagged by the case unit inspection cell 142 as a reorient case unit 587, the controller 199C communicates the information to, e.g., palletizer controller 464 (as noted above, the palletizer controller 464 may be or form part of controller 199C or may be a separate controller). As described above, the case orienting system 500 is disposed inline with the out case conveyor 150a (and the traverse axis 595) to effect reorienting of the case units 585 identified by the case unit inspection cell 142 as a reorient case unit 587. The case orienting system 500 reorients the case unit 587 according to the predetermined case unit output scheme. The palletizer controller 464 instructs the robot manipulator 14 (according to the information received from controller 199C) to transfer the case unit 587 to be oriented onto the bias support 520 of the case orientation system 500. The robot manipulator 14 picks (e.g., grips) or pushes, with the end of arm tool based on the characteristics identified by the case unit inspection cell 142, the case unit 587 from the output conveyor 325 and positions the case unit 587 on the bias support 520 (FIG. 6A) (i.e., the respective reorient case unit 587 is moved along the shunt path (e.g., linear and lateral motion effect set Δ, yaw θ rotation from the traverse transport 510 to the bias support 520 so as to be positioned for reorientation) (FIG. 7, Block 7010) such that a seating surface 587SS of the case unit 587 is engaged and seated against the bias support 520, supporting the case unit 587 in a first orientation 1000. With the case unit positioned on the bias support 520, the conveyor pivoting system 570 and the bias support moving system 575 are activated, each providing controlled independent movement, to reorient the case unit 587 (i.e., the case unit 587 is stably supported during transfer between the bias support 520 and the traverse transport 510 such that the reorient case unit 587 is substantially supported during transition). As noted above, the reorientation action is performed substantially within the transaction time of the case flow (substantially without disruption of non-orienting case flow past the case orienting system 500). For example, the actuator 572 that controls pivoting movement of the traverse transport 510 is actuated to pivot the traverse transport 510 in direction 597 about the traverse pivot axis 511 towards the bias support 520 (see FIG. 6C). In one aspect, the traverse transport 510 is pivoted to about 60° relative to the common case support plane 590C, or any other suitable angle.

In one aspect, where the bias support moving system 575 is a pivoting system, the actuator 576 that controls pivoting movement of the bias support 520, substantially simultaneously to the actuator 572, is actuated to pivot the bias support 520 (with the case unit 587 thereon) in direction 596 about the plate pivot axis 521 towards the traverse transport 510. In another aspect, the actuator 576 is actuated once the actuator 572 reaches a max pivot point (e.g., about 60°). When the case unit 587 comes into contact with the traverse transport 510, the actuator 572 discontinues actuation so that the traverse transport stops pivoting in direction 597 (FIG. 6D) (e.g., when the traverse transport 510 and the bias support 520 are perpendicular (about 90°) relative to one another). In one aspect, the traverse transport 510 and the bias support 520, together as a unit in the perpendicular position, rotate in direction 596 to return the traverse transport 510 to its position of origin so as to reorient the case unit 90°, relative to the common case support plane 590C of the case orienting system 500 (FIG. 6E) (FIG. 7, Block 7011). In this aspect, the bias support 520 effects transfer of the case unit 587 from the bias support 520 to the traverse transport 510. The reference datum 590 positions and justifies the case unit 587 so that the case unit 587 is aligned on the out case conveyor 150B for downstream transport of the case unit 587 (i.e., the case unit does not extend beyond the edges 513LE1, 513LE2 forming the edge of the reference datum 590 of the conveyor and the reorient case units 587 are aligned substantially in common with the pass through case unit 586 aligned with the traverse axis 595 defining the traverse direction 598 of the in-out case conveyor 150 substantially coincident with the reorientation action, such that no further justification of the reorient case units 587 is performed to align the reorient case units 587 with the traverse axis 595 post-reorientation) (FIG. 7, Block 7012). In another aspect, the bias support 520 returns to its position of origin upon transferring the case unit 587 to the traverse transport 510 such that the bias support 520 does not follow the traverse transport 510 to its position of origin. Once the case unit 587 is reoriented, the case unit 587 is free to be transferred to the palletizer cell 10B (FIG. 7, Block 7013).

As noted above, the palletizer cell 10B is in communication with the out case conveyor 150B so that the palletizer cell 10B receives the case units from the automated storage and retrieval system 100 for placement on pallets according to the case unit output scheme determined by the controller 199C. The case units arrive at the palletizer cell 10B via the in/out case conveyors 150B and are picked by the robotic case manipulator 14 and placed serially onto the pallet so as to build the pallet load based on the case unit output scheme.

In accordance with one or more aspects of the present disclosure a case orienting system is provided. The case orienting system including a frame having a reference datum, a traverse transport pivotally coupled to the frame about a traverse pivot axis, the traverse transport including a substantially continuous movable platform configured to support and transport at least one case in a case traverse direction along a traverse axis, the substantially continuous movable platform pivots about the traverse pivot axis so as to orient the case traverse direction to another traverse direction, and a bias support disposed adjacent to and opposing the traverse transport and being movably coupled to the frame to move relative to the frame in opposition to the traverse transport, the bias support being configured to engage and seat against a seating surface of the at least one case to support the at least one case in a first orientation relative to the reference datum, wherein the substantially continuous movable platform and the bias support are configured so as to move relative to each other so as to cause the at least one case to engage a tipping fulcrum so that an orientation of the at least one case changes from the first orientation to a second different orientation so that a bias surface of the at least one case is seated against the substantially continuous movable platform in the another traverse direction and the seating surface of the at least one case is disengaged from the bias support.

In accordance with one or more aspects of the present disclosure the bias support pivots about a support pivot axis such that the traverse transport and the bias support pivot towards each other about a respective one of the traverse pivot axis and the support pivot axis.

In accordance with one or more aspects of the present disclosure the at least one case supported on the bias support is stably transferred to the substantially continuous movable platform.

In accordance with one or more aspects of the present disclosure the substantially continuous movable platform defines a datum and the at least one case is prepositioned, by the bias support, with respect to the datum so that upon positioning the substantially continuous movable platform, with the at least one case transferred thereon, and orienting the case direction different from the another direction to align with the traverse axis, the at least one case is disposed in the traverse direction substantially inline with the traverse axis.

In accordance with one or more aspects of the present disclosure an area of the substantially continuous movable platform is shaped and sized to substantially conform with a bias surface area of a largest one of the at least one case accepted in the case orienting system.

In accordance with one or more aspects of the present disclosure the substantially continuous movable platform has a width of about 30 inches.

In accordance with one or more aspects of the present disclosure the bias support is spaced from the substantially continuous movable platform so as to form a gap between the bias support and the substantially continuous movable platform, the case orienting system further comprising a pliable support web disposed within the gap and coupled to both the bias support and the traverse transport.

In accordance with one or more aspects of the present disclosure the substantially continuous movable platform comprises lateral edges extending in the traverse direction, and the bias support extends between the lateral edges to effect transfer of the at least one case from the bias support to the substantially continuous movable platform.

In accordance with one or more aspects of the present disclosure the bias support places the at least one case onto the substantially continuous movable platform at least a predetermined distance from one of the lateral edges.

In accordance with one or more aspects of the present disclosure the substantially continuous movable platform comprises a belted conveyor.

In accordance with one or more aspects of the present disclosure a method is provided. The method including providing a frame having a reference datum, providing a traverse transport pivotally coupled to the frame about a traverse pivot axis, the traverse transport including a substantially continuous movable platform configured to support and transport at least one case in a case traverse direction along a traverse axis, the substantially continuous movable platform pivots about the traverse pivot axis so as to orient the case traverse direction to another traverse direction, and providing a bias support disposed adjacent to and opposing the traverse transport and being movably coupled to the frame to move relative to the frame in opposition to the traverse transport, the bias support being configured to engage and seat against a seating surface of the at least one case to support the at least one case in a first orientation relative to the reference datum, moving the substantially continuous movable platform and the bias support relative to each other so as to cause the at least one case to engage a tipping fulcrum so that an orientation of the at least one case changes from the first orientation to a second different orientation so that a bias surface of the at least on case is seated against the substantially continuous movable platform in the another traverse direction and the seating surface of the at least one case is disengaged from the bias support.

In accordance with one or more aspects of the present disclosure a case orienting system is provided. The case orienting system including a frame having a reference datum, a traverse pivotally coupled to the frame about a traverse pivot axis, the traverse including a substantially continuous movable platform configured to support and transport at least one case in a traverse direction, the substantially continuous movable platform pivots about the traverse pivot axis, and a support plate disposed adjacent the traverse and being coupled to the frame about a plate pivot axis, the support plate being configured to support the at least one case in a first orientation relative to the reference datum, wherein the substantially continuous movable platform and the support plate are configured to pivot towards each other about a respective one of the traverse pivot axis and the plate pivot axis so that the at least one case supported on the support plate in the first orientation is stably transferred to the substantially continuous movable platform, the at least one case supported on the substantially continuous movable platform having a second orientation, relative to the reference datum, that is different than the first orientation.

In accordance with one or more aspects of the present disclosure the substantially continuous movable platform and the support plate are configured to pivot away from each other about a respective one of the traverse pivot axis and the plate pivot axis so as to form a common case support plane, the common case support plane forming the reference datum of the frame.

In accordance with one or more aspects of the present disclosure the support plate is spaced from the substantially continuous movable platform so as to form a gap between the support plate and the substantially continuous movable platform, the case orienting system further comprising a pliable support web disposed within the gap and coupled to both the support plate and the traverse.

In accordance with one or more aspects of the present disclosure the traverse pivot axis and the plate pivot axis are coaxial and extend along the traverse direction (each axis extends along the traverse direction).

In accordance with one or more aspects of the present disclosure the substantially continuous movable platform comprises lateral edges extending in the traverse direction and the support plate extends between the lateral edges to effect transfer of the at least one case from the support plate to the substantially continuous movable platform.

In accordance with one or more aspects of the present disclosure the support plate places the at least one case onto the substantially continuous movable platform at least a predetermined distance from one of the lateral edges.

In accordance with one or more aspects of the present disclosure the substantially continuous movable platform comprises a belted conveyor.

In accordance with one or more aspects of the present disclosure the case orienting system further includes a traverse pivot actuator coupled to both the frame and the traverse, the traverse pivot actuator being configured to pivot the traverse about the traverse pivot axis, and a plate pivot actuator separate and distinct from the traverse pivot actuator, the plate pivot actuator being coupled to both the frame and the support plate, the plate pivot actuator being configured to pivot the support plate about the plate pivot axis.

In accordance with one or more aspects of the present disclosure the case orienting system has a longitudinal length, in the traverse direction, of about thirty inches (about 740 mm).

In accordance with one or more aspects of the present disclosure a storage and retrieval system is provided. The storage and retrieval system including a multilevel storage structure, and a case manipulation cell coupled to the multilevel storage structure, the case manipulation cell includes a conveyor communicably coupled to the multilevel storage structure, the conveyor having a case support surface configured to effect a transfer of at least one case between the multilevel storage structure and the case manipulation cell, a case orienting system coupled to the conveyor and having a traverse including a substantially continuous movable platform configured to support and transport at least one case in a traverse direction between the case orienting system and the conveyor, the substantially continuous movable platform being configured to pivot relative to a case support plane of the conveyor about a traverse pivot axis, and a support plate disposed adjacent the traverse, the support plate being pivotable about a plate pivot axis and configured to support the at least one case in a first orientation relative to the case support plane of the conveyor, wherein the substantially continuous movable platform and the support plate are configured to pivot towards each other about a respective one of the traverse pivot axis and the plate pivot axis so that the at least one case supported on the support plate in the first orientation is stably transferred to the substantially continuous movable platform, the at least one case supported on the substantially continuous movable platform having a second orientation, relative to the case support plane of the conveyor, that is different than the first orientation.

In accordance with one or more aspects of the present disclosure the storage and retrieval system further including a case unit inspection cell configured to detect cases of the at least one case that exceed a predetermined height relative to the conveyor support plane.

In accordance with one or more aspects of the present disclosure the storage and retrieval system further including a case manipulation robot configured to place at least one of the cases that exceeds the predetermined height on the support plate for reorientation.

In accordance with one or more aspects of the present disclosure the storage and retrieval system further including a case manipulation robot configured to place at least one other case that is within the predetermined height on the traverse for transfer to the conveyor.

In accordance with one or more aspects of the present disclosure the substantially continuous movable platform and the support plate are configured to pivot away from each other about a respective one of the traverse pivot axis and the plate pivot axis so as to form a portion of the case support plane.

In accordance with one or more aspects of the present disclosure the support plate is spaced from the substantially continuous movable platform so as to form a gap between the support plate and the substantially continuous movable platform, the case orienting system further comprising a pliable support web disposed within the gap and coupled to both the support plate and the substantially continuous movable platform.

In accordance with one or more aspects of the present disclosure the traverse pivot axis and the plate pivot axis are coaxial and extend along the traverse direction (each axis extends along the traverse direction).

In accordance with one or more aspects of the present disclosure the substantially continuous movable platform comprises lateral edges extending in the traverse direction, and the support plate extends between the lateral edges to effect transfer of the at least one case from the support plate to the substantially continuous movable platform.

In accordance with one or more aspects of the present disclosure the support plate places the at least one case onto the substantially continuous movable platform at least a predetermined distance from one of the lateral edges.

In accordance with one or more aspects of the present disclosure the substantially continuous movable platform comprises a belted conveyor.

In accordance with one or more aspects of the present disclosure the storage and retrieval system further including a traverse pivot actuator coupled to both the frame and the traverse, the traverse pivot actuator being configured to pivot the traverse about the traverse pivot axis, and a plate pivot actuator separate and distinct from the traverse pivot actuator, the plate pivot actuator being coupled to both the frame and the support plate, the plate pivot actuator being configured to pivot the support plate about the plate pivot axis.

In accordance with one or more aspects of the present disclosure the case orienting system has a longitudinal length, in the traverse direction, of about thirty inches (about 740 mm).

In accordance with one or more aspects of the present disclosure a method of automated case orienting is provided. The method including providing a frame having a reference datum, a traverse pivotally coupled to the frame about a traverse pivot axis, and a support plate disposed adjacent the traverse and being coupled to the frame about a plate pivot axis, placing a case on the support plate, the case being supported by the support plate in a first orientation relative to the reference datum, pivoting a substantially continuous movable platform, of the traverse, and the support plate towards each other so that the at least one case supported on the support plate in the first orientation is stably transferred to the substantially continuous movable platform, the at least one case supported on the substantially continuous movable platform having a second orientation, relative to the reference datum, that is different than the first orientation.

In accordance with one or more aspects of the present disclosure further including pivoting the substantially continuous movable platform and the support plate away from each other about a respective one of the traverse pivot axis and the plate pivot axis so as to form a common case support plane, the common case support plane forming the reference datum of the frame.

In accordance with one or more aspects of the present disclosure the support plate is spaced from the substantially continuous movable platform so as to form a gap between the support plate and the substantially continuous movable platform, the method further comprising providing a pliable support web disposed within the gap and coupled to both the support plate and the traverse.

In accordance with one or more aspects of the present disclosure the traverse pivot axis and the plate pivot axis are coaxial and extend along the traverse direction (each axis extends along the traverse direction).

In accordance with one or more aspects of the present disclosure the substantially continuous movable platform comprises lateral edges extending in the traverse direction, the method further comprising extending the support plate between the lateral edges to effect transfer of the at least one case from the support plate to the substantially continuous movable platform.

In accordance with one or more aspects of the present disclosure further including positioning, with the support plate, the at least one case onto the substantially continuous movable platform at least a predetermined distance from one of the lateral edges.

In accordance with one or more aspects of the present disclosure the substantially continuous movable platform comprises a belted conveyor.

In accordance with one or more aspects of the present disclosure further including pivoting, with a traverse pivot actuator coupled to both the frame and the traverse, the traverse about the traverse pivot axis, and pivoting, with a plate pivot actuator separate and distinct from the traverse pivot actuator, the plate pivot actuator being coupled to both the frame and the support plate, the support plate about the plate pivot axis.

In accordance with one or more aspects of the present disclosure the case orienting system has a longitudinal length, in the traverse direction, of about thirty inches (about 740 mm).

In accordance with one or more aspects of the present disclosure a method of automated case orienting is provided. The method including providing a multilevel storage structure of a storage and retrieval system, and providing a case manipulation cell coupled to the multilevel storage structure, including a conveyor having a case support surface communicably coupled to the multilevel storage structure, and a case orienting system coupled to the conveyor and having a traverse including a substantially continuous movable platform configured to support and transport at least one case in a traverse direction between the case orienting system and the conveyor and a support plate disposed adjacent the traverse and configured to support the at least one case in a first orientation relative to the case support plane of the conveyor, effecting, with the conveyor a transfer of at least one case between the multilevel storage structure and the case manipulation cell, pivoting the substantially continuous movable platform and the support plate towards each other about a respective one of the traverse pivot axis and the plate pivot axis so that the at least one case supported on the support plate in the first orientation is stably transferred to the substantially continuous movable platform, the at least one case supported on the substantially continuous movable platform having a second orientation, relative to the case support plane of the conveyor, that is different than the first orientation.

D2 In accordance with one or more aspects of the present disclosure further including detecting, with a case unit inspection cell cases of the at least one case that exceed a predetermined height relative to the conveyor support plane.

In accordance with one or more aspects of the present disclosure further including placing, with a case manipulation robot at least one of the cases that exceeds the predetermined height on the support plate for reorientation.

In accordance with one or more aspects of the present disclosure further including placing, with a case manipulation robot at least one other case that is within the predetermined height on the traverse for transfer to the conveyor.

D5 In accordance with one or more aspects of the present disclosure further including pivoting the substantially continuous movable platform and the support plate away from each other about a respective one of the traverse pivot axis and the plate pivot axis to form a portion of the case support plane.

In accordance with one or more aspects of the present disclosure the support plate is spaced from the substantially continuous movable platform so as to form a gap between the support plate and the substantially continuous movable platform, the method further comprising providing a pliable support web disposed within the gap and coupled to both the support plate and the substantially continuous movable platform.

In accordance with one or more aspects of the present disclosure the traverse pivot axis and the plate pivot axis are coaxial and extend along the traverse direction (each axis extends along the traverse direction).

In accordance with one or more aspects of the present disclosure the substantially continuous movable platform comprises lateral edges extending in the traverse direction, the method further comprising extending the support plate between the lateral edges effecting transfer of the at least one case from the support plate to the substantially continuous movable platform.

In accordance with one or more aspects of the present disclosure further including positioning, with the support plate, the at least one case onto the substantially continuous movable platform at least a predetermined distance from one of the lateral edges.

In accordance with one or more aspects of the present disclosure the substantially continuous movable platform comprises a belted conveyor.

In accordance with one or more aspects of the present disclosure further including pivoting, with a traverse pivot actuator coupled to both the frame and the traverse, the traverse about the traverse pivot axis; and pivoting, with a plate pivot actuator separate and distinct from the traverse pivot actuator, the plate pivot actuator being coupled to both the frame and the support plate, the support plate about the plate pivot axis.

In accordance with one or more aspects of the present disclosure the case orienting system has a longitudinal length, in the traverse direction, of about thirty inches (about 740 mm).

It should be understood that the foregoing description is only illustrative of the aspects of the present disclosure. Various alternatives and modifications can be devised by those skilled in the art without departing from the aspects of the present disclosure. Accordingly, the aspects of the present disclosure are intended to embrace all such alternatives, modifications and variances that fall within the scope of any claims appended hereto. Further, the mere fact that different features are recited in mutually different dependent or independent claims does not indicate that a combination of these features cannot be advantageously used, such a combination remaining within the scope of the aspects of the present disclosure.

What is claimed is:

1. A method of automated case orienting, the method comprising:
providing a frame having a reference datum, a traverse pivotally coupled to the frame about a traverse pivot axis, and a support plate disposed adjacent the traverse and being coupled to the frame about a plate pivot axis;
placing at least one case on the support plate, the at least one case being supported by the support plate in a first orientation relative to the reference datum; and
pivoting a substantially continuous movable platform, of the traverse, and the support plate in opposite directions so that the at least one case supported on the support plate in the first orientation is stably transferred to the substantially continuous movable platform, the at least one case supported on the substantially continuous movable platform having a second orientation, relative to the reference datum, that is different than the first orientation.

2. The method of claim 1, further comprising pivoting the substantially continuous movable platform and the support plate away from each other about a respective one of the traverse pivot axis and the plate pivot axis so as to form a common case support plane, the common case support plane forming the reference datum of the frame.

3. The method of claim 1, wherein the support plate is spaced from the substantially continuous movable platform so as to form a gap between the support plate and the substantially continuous movable platform, the method further comprising providing a pliable support web disposed within the gap and coupled to both the support plate and the traverse.

4. The method of claim 1, wherein the traverse pivot axis and the plate pivot axis are coaxial and extend along a traverse direction (each axis extends along the traverse direction).

5. The method of claim 1, wherein the substantially continuous movable platform comprises lateral edges extending in a traverse direction, the method further comprising extending the support plate between the lateral edges to effect transfer of the at least one case from the support plate to the substantially continuous movable platform.

6. The method of claim 5, further comprising positioning, with the support plate, the at least one case onto the substantially continuous movable platform at least a predetermined distance from one of the lateral edges.

7. The method of claim 1, wherein the substantially continuous movable platform comprises a belted conveyor.

8. The method of claim 1, further comprising pivoting, with a traverse pivot actuator coupled to both the frame and the traverse, the traverse about the traverse pivot axis, and pivoting, with a plate pivot actuator separate and distinct, from the traverse pivot actuator, the plate pivot actuator being coupled to both the frame and the support plate, the support plate about the plate pivot axis.

9. The method of claim 1, wherein the case orienting system has a longitudinal length, in the traverse direction, of about thirty inches.

10. A method of automated case orienting, the method comprising:
providing a distributed storage array of a storage and retrieval system;
providing a case manipulation cell coupled to the distributed storage array, including
a conveyor having a case support surface communicably coupled to the distributed storage array, and
case orienting system coupled to the conveyor and having
a traverse including a substantially continuous movable platform configured to support and transport at least one case in a traverse direction between the case orienting system and the conveyor and
a support plate disposed adjacent the traverse and configured to support the at least one case in a first orientation relative to the case support surface of the conveyor;
effecting, with the conveyor a transfer of at least one case between the distributed storage array and the case manipulation cell; and
pivoting the substantially continuous movable platform and the support plate in opposite directions about a respective one of a traverse pivot axis and a plate pivot axis so that the at least one case supported on the support plate in the first orientation is stably transferred to the substantially continuous movable platform, the at least one case supported on the substantially continuous movable platform having a second orientation, relative to the case support surface of the conveyor, that is different than the first orientation.

11. The method of claim 10, further comprising detecting, with a case unit inspection cell cases of the at least one case that exceed a predetermined height relative to the conveyor support surface.

12. The method of claim 11, further comprising placing, with a case manipulation robot at least one of the cases that exceeds the predetermined height on the support plate for reorientation.

13. The method of claim 11, further comprising placing, with a case manipulation robot at least one other case that is within the predetermined height on the traverse for transfer to the conveyor.

14. The method of claim 10, further comprising pivoting the substantially continuous movable platform and the support plate away from each other about a respective one of the traverse pivot axis and the plate pivot axis to form a portion of the case support surface.

15. The method of claim 10, wherein the support plate is spaced from the substantially continuous movable platform so as to form a gap between the support plate and the substantially continuous movable platform, the method further comprising providing a pliable support web disposed within the gap and coupled to both the support plate and the substantially continuous movable plat form.

16. The method of claim 10, wherein the traverse pivot axis and the plate pivot axis are coaxial and extend along the traverse direction.

17. The method of claim 10, wherein the substantially continuous movable platform comprises lateral edges extending in the traverse direction, the method further comprising extending the support plate between the lateral edges effecting transfer of the at least one case from the support plate to the substantially continuous movable platform.

18. The method of claim 17, further comprising positioning, with the support plate, the at least one case onto the substantially continuous movable platform at least a predetermined distance from one of the lateral edges.

19. The method of claim 10, wherein the substantially continuous movable platform comprises a belted conveyor.

20. The method of claim 10, further comprising pivoting, with a traverse pivot actuator coupled to both the frame and the traverse, the traverse about the traverse pivot axis; and pivoting, with a plate pivot actuator separate and distinct from the traverse pivot actuator, the plate pivot actuator being coupled to both the frame and the support plate, the support plate about the plate pivot axis.

21. The method of claim 10, wherein the case orienting system has a longitudinal length, in the traverse direction, of about thirty inches.

22. A system for automated case orienting, the system comprising:
a frame having a reference datum;
a traverse having a substantially continuous movable platform pivotally coupled to the frame about a traverse pivot axis;
a support plate disposed adjacent the traverse and being coupled to the frame about a plate pivot axis, the support plate being configured to receive at least one case on the support plate, the at least one case being supported by the support plate in a first orientation relative to the reference datum; and
wherein the substantially continuous movable platform, of the traverse, and the support plate are configured to pivot in opposite directions so that the at least one case supported on the support plate in the first orientation is stably transferred to the substantially continuous movable platform, the at least one case supported on the substantially continuous movable platform having a second orientation, relative to the reference datum, that is different than the first orientation.

23. The system of claim 22, wherein the substantially continuous movable plat form and the support plate are configured to pivot away from each other about a respective one of the traverse pivot, axis and the plate pivot axis so as to form a common case support plane, the common case support plane forming the reference datum of the frame.

24. The system of claim 22, further comprising a pliable support web disposed within a gap formed between the support plate and the substantially continuous movable platform, and coupled to both the support plate and the traverse.

25. The system of claim 22, wherein the traverse pivot axis and the plate pivot axis are coaxial and extend along a traverse direction.

26. The system of claim 22, wherein the substantially continuous movable platform comprises lateral edges extending in a traverse direction, the support plate extending between the lateral edges to effect transfer of the at least one case from the support plate to the substantially continuous movable platform.

27. The system of claim 26, wherein the support plate positions the at least one case onto the substantially continuous movable platform at least a predetermined distance from one of the lateral edges.

28. The system of claim 22, wherein the substantially continuous movable platform comprises a belted conveyor.

29. The system of claim 22, further comprising a traverse pivot actuator and a plate pivot actuator, separate and distinct from the traverse pivot actuator, the traverse pivot actuator, coupled to both the frame and the traverse, being configured to pivot the traverse about the traverse pivot axis, and the plate pivot actuator, coupled to both the frame and the support plate, being configured to pivot the support plate about the plate pivot axis.

30. The system of claim 22, wherein the case orienting system has a longitudinal length, in the traverse direction, of thirty inches.

31. A system for automated case orienting, the system comprising:
a frame having a reference datum;
a traverse having a substantially continuous movable platform pivotally coupled to the frame about a traverse pivot axis;
a support plate disposed adjacent the traverse and being coupled to the frame about a plate pivot axis, the support plate being configured to receive at least one case on the support plate, the at least one case being supported by the support plate in a first orientation relative to the reference datum; and
wherein the substantially continuous movable platform, of the traverse, and the support plate are configured to pivot in opposite directions so that the at least one case supported on the support plate in the first orientation is stably transferred to the substantially continuous movable platform, the at least one case supported on the substantially continuous movable platform having a second orientation, relative to the reference datum, that is different than the first orientation,
wherein at least one of the traverse and support plate are disposed to receive the at least one case from a robot.

* * * * *